(12) United States Patent
Smaglinski

(10) Patent No.: US 6,832,031 B2
(45) Date of Patent: Dec. 14, 2004

(54) OPTICAL MODIFIER AND METHOD FOR THE MANUFACTURE THEREOF

(75) Inventor: Ingo Smaglinski, Mainz (DE)

(73) Assignee: Cube Optics AG, Mainz (DE)

(*) Notice: Subject to any disclaimer, the term of this patent is extended or adjusted under 35 U.S.C. 154(b) by 154 days.

(21) Appl. No.: 09/947,088

(22) Filed: Sep. 4, 2001

(65) Prior Publication Data

US 2002/0051303 A1 May 2, 2002

(30) Foreign Application Priority Data

Sep. 5, 2000 (DE) ........................... 100 43 985

(51) Int. Cl.$^7$ ............... G02B 6/26; G02B 6/42
(52) U.S. Cl. ............... 385/47; 385/15; 385/31
(58) Field of Search ............... 385/14, 15, 31, 385/47

(56) References Cited

U.S. PATENT DOCUMENTS

| | | | |
|---|---|---|---|
| 3,883,223 A | | 5/1975 | Hudson |
| 4,422,714 A | | 12/1983 | Benoit et al. |
| 4,441,784 A | | 4/1984 | Korth |
| 4,583,820 A | | 4/1986 | Flamand et al. |
| 4,693,544 A | | 9/1987 | Yamasaki et al. |
| 4,699,453 A | | 10/1987 | Roberts |
| 4,701,010 A | * | 10/1987 | Roberts ............... 385/31 |
| 4,740,951 A | * | 4/1988 | Lizet et al. ............... 359/130 |
| 4,744,618 A | | 5/1988 | Mahlein |
| 5,420,946 A | * | 5/1995 | Tsai ............... 385/22 |
| 5,687,262 A | | 11/1997 | Buchin |
| 6,198,864 B1 | * | 3/2001 | Lemoff et al. ............... 385/47 |
| 6,213,650 B1 | * | 4/2001 | Moriyama et al. ............... 385/88 |
| 6,456,756 B1 | * | 9/2002 | Mead et al. ............... 385/24 |
| 6,493,124 B1 | * | 12/2002 | Haberkorn ............... 359/174 |
| 6,516,115 B1 | * | 2/2003 | Fujita et al. ............... 385/31 |
| 6,563,980 B1 | | 5/2003 | Dultz et al. |
| 6,584,102 B1 | * | 6/2003 | Lu ............... 370/389 |

FOREIGN PATENT DOCUMENTS

| | | |
|---|---|---|
| DE | 2509112 A1 | 10/1975 |
| DE | 3019955 A1 | 12/1981 |
| DE | 3345038 A1 | 6/1984 |
| DE | 3216516 A1 | 5/1988 |
| DE | 4008483 A1 | 9/1991 |
| DE | 4221918 C2 | 7/1996 |
| DE | 19606028 A1 | 8/1997 |
| DE | 19745323 A1 | 5/1999 |
| EP | 1004907 A2 | 7/1999 |
| JP | 09033749 A | 2/1997 |
| JP | 10260334 A | 9/1998 |

OTHER PUBLICATIONS

PCT International Search Report dated Feb. 25, 2002 on application No. PCT/DE01/03393.
English translation of abstract of DE 19606028, F.F. 4221918, and DE 4008483.
German Patent Office Search Report dated May 3, 2001 for application No. 10043985.3.

* cited by examiner

Primary Examiner—Akm Enayet Ullah
Assistant Examiner—Michelle R. Connelly-Cushwa
(74) Attorney, Agent, or Firm—Paul & Paul

(57) ABSTRACT

The present invention relates to an optical modifier, in which single or several wavelength channels are fed into or fed out of transmission and/or receiving elements including, for example, wave guides. In order to fabricate an optical modifier that can intentionally affect one or more wavelength channels, that is inexpensive to manufacture, that allows as low loss as possible feed-in and feed-out of light in the smallest of spaces, and wherein at the same time the optical modifier is easy to calibrate, it is proposed according to the invention that at least one coupling device (20) with a curved surface (8) and a wave-modifying element (19) are provided. Furthermore, the invention relates to a method for manufacturing an optical modifier, wherein the reflecting surface (8) is manufactured as part of a surface of revolution with a cone section as the curve generating the envelope.

21 Claims, 20 Drawing Sheets

Figure 1A:
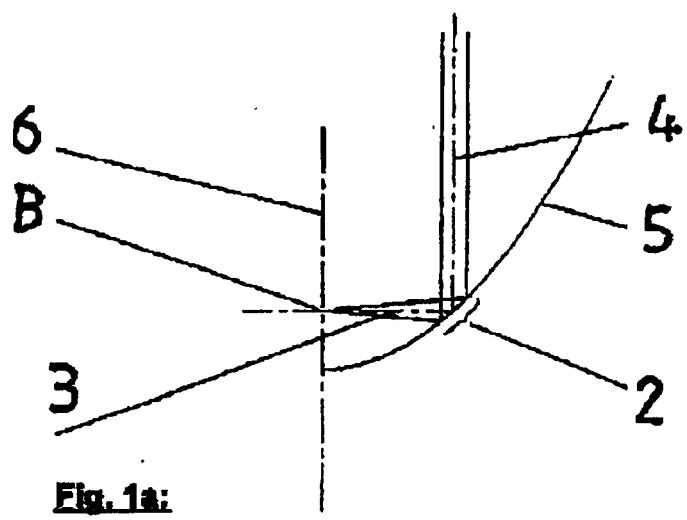

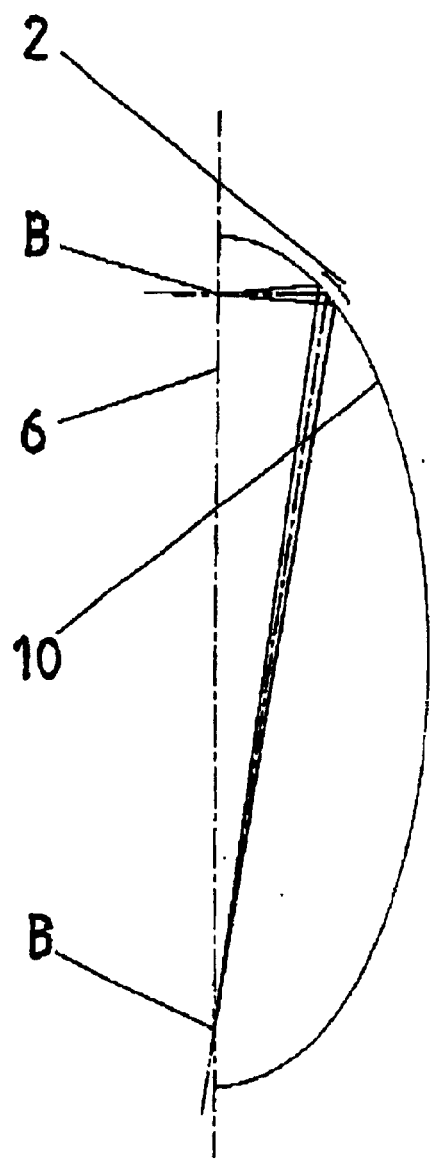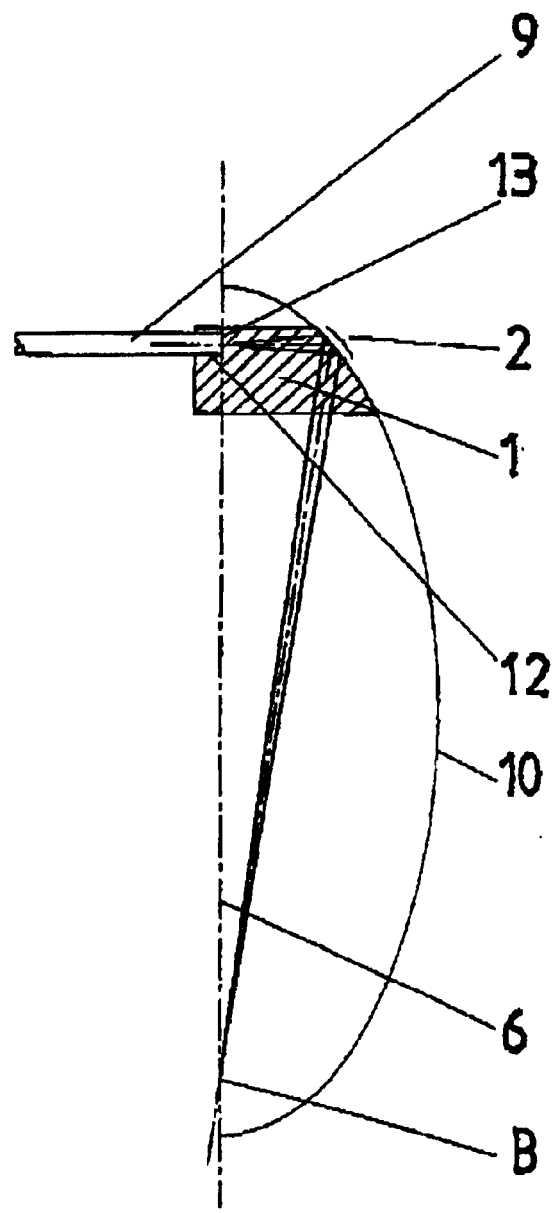
Fig. 5a:  Fig. 5b:

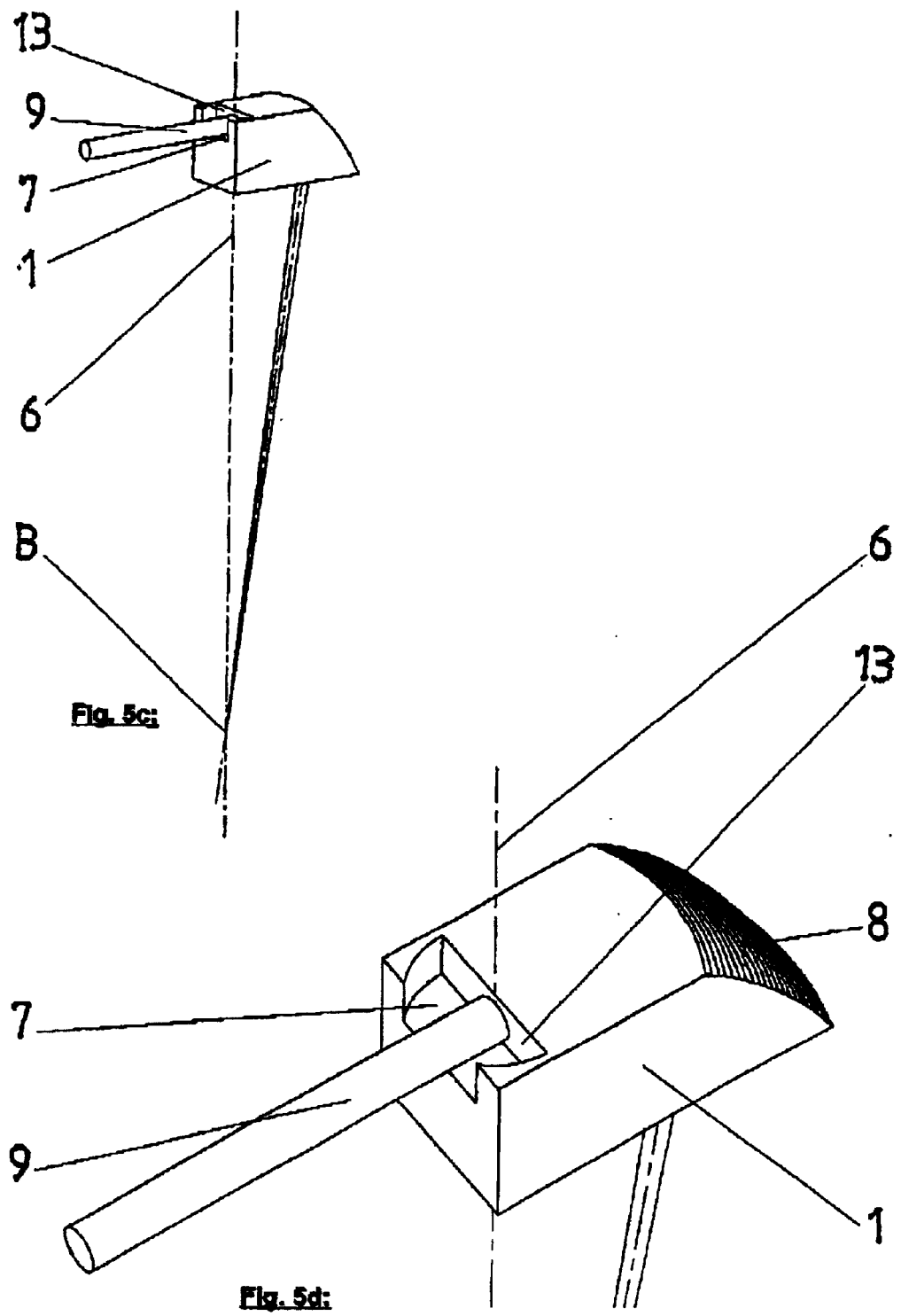

I. Manufacture at least two coupling devices with a reflecting surface as part of a surface of revolution with a cone section as the generating curve of the envelope by means of turning or milling and/or polishing.

II. Manufacture of a limit stop surface in the same (chuck) clamp in which the reflecting surface was turned or milled by turning perpendicular to the axis of rotation of the reflecting surface.

III. Arrange a wave modifying element in the beam path and between the at least two coupling devices such that the light signal reflected from one coupling device is directed on the other coupling device.

*FIG. 23*

OPTICAL MODIFIER AND METHOD FOR THE MANUFACTURE THEREOF

The present invention relates to an optical modifier, for example, for feeding in or feeding out signals of single or a plurality of wavelength channels into or from wave guides, and to a method for the manufacture thereof.

In particular in telecommunications and data communication, it has become normal to transmit information optically, that is to say, for example, via optical guides. Optical guides are in general thin fibres of highly transparent optical materials, which conduct light along their longitudinal direction by means of numerous total internal reflections. The light, generally entering via a smooth entry surface, follows all the curves of the fibres and at the end emerges from an end surface that is generally also smooth. The electrical signals that are to be transmitted are converted, after suitable modulation, by an electro-optical converter into light signals—mostly in the infra-red range, are fed into the optical wave guide, transmitted by the optical wave guide, and at the end are reconverted into electrical signals by means of an opto-electrical converter. In order to increase the rate of transmission of the optical wave guide, it has become usual to transmit several different communications signals simultaneously via one optical wave guide. For this, the communications signals are modulated. For the different communications signals, different respective carrier frequencies are used, wherein the individual discrete frequency components of the whole transmitted signal are often also referred to as channels. After transmission of the individual communications signals or respectively wavelength channels, via the optical wave guide, the individual signals have to be separated and demodulated.

In the prior art devices are therefore known for adding and selecting wavelength coded signals (light of a specific wavelength or specific wavelengths), so-called multiplexer or de-multiplexer arrangements. Such devices use optical fibres that have a large information carrying density. The purpose of the devices is to separate out relevant information or respectively a relevant wavelength channel from the large amount of information transmitted. For this separation, narrow band reflectors can, for example, be used that allow certain light frequencies to pass almost unhindered, while selected frequencies are reflected. When the light emerges from the glass fibres, there is, however, inevitably an expansion of the beam, which leads to either significant reduction in intensity at the focussing point, that is to say at the point where the filtered light is evaluated, or the use of appropriate lens systems, for example, gradient refractive index lenses (GRIN lenses) is necessary in order to collimate the light onto the corresponding focussing point.

The embodiment with the lenses has the disadvantage, however, that they are on the one hand very expensive, and on the other hand very precise calibration is necessary, and moreover the focussing properties are also still dependent on the wavelength. This calibration must usually be done expensively by hand as the core diameter, for example, of the optical single mode fibres is only 9 $\mu$m. The known multiplexer/de-multiplexer arrangements also take up a lot of space which translates into correspondingly bulky embodiments of the respective optical components. The cause of this is, in addition to the geometric expansion of the lens system, the inherent property of glass fibres not to be able to be deflected or bent at will. It is not possible, for example, to bend glass fibres with a radius smaller than approximately 20 to 30 mm, as losses become too great because in part the conditions for total internal reflection are no longer satisfied. Appropriately large deflecting loops therefore have to be laid out that take up a significant amount of space in the optical systems. There is thus a need for an optical modifier that can intentionally affect one or more wavelength channels, that is inexpensive to manufacture, that allows feeding in and feeding out of light with as low a loss as possible in the most confined of spaces, and wherein at the same time the optical modifier is easy to calibrate.

This object is solved according to the invention in that there is provided at least one coupling device with a curved reflecting surface and a wave modifying element. A wave modifying element is understood to be any element that, placed in the beam path, affects one, several, or even all of the wavelength channels of the optical channel. To affect is understood as being, for example, to reflect, absorb, amplify, attenuate, interrupt or polarise.

The coupling device serves to feed in and feed out signals, for example, into and out of glass fibres. Because a reflecting surface is provided that is curved, the optical lens system can be omitted, as the beam expansion occurring at the end of a glass fibre is at least partially compensated for by the curved surface.

An embodiment is particularly preferred wherein a section through the curved surface of the coupling device corresponds approximately to a portion of a parabola, a hyperbola, or an ellipse. In other words, all the second order plane curves that are often described as cone sections, apart from a straight line, are particularly suitable for the profile for the curved surface. The reflecting surface is curved such that it follows a portion of an imaginary second order plane curve. These shapes have particularly good focussing properties so they are particularly suitable for use in a coupling device. Thus, for example, a beam expanding at the focal point of an ellipse, that is reflected on the ellipse, is focussed at the other focal point of the ellipse. Consequently, the whole amount of light emergent at the first focal point is available in almost point form at the other focal point. On the other hand, a beam expanding at the focal point of a parabola is reflected on the parabola such that the reflected light is substantially parallel. This parallel light can now be used to impinge upon the light-modifying element. Because the light is substantially parallel, it is ensured that the light-modifying element receives all the communications signals almost without loss.

A particularly advantageous embodiment provides that the reflecting surface of the coupling device has approximately the shape of a portion of a paraboloid of revolution, an ellipsoid of revolution, or a hyperboloid of revolution. In other words, the reflecting surface follows at least little by little the external surface of a solid generated by revolution. This means that a section through the reflecting surface along a section plane perpendicular to the axis of rotation has approximately the shape of a segment of a circle, while a section along a plane in which the axis of rotation lies has approximately the shape of a portion of a parabola, hyperbola or ellipse. Such a curved reflecting surface has particularly suitable focussing properties, so the losses caused by feeding in and feeding out are very small and the use of a collimator is unnecessary.

In order to obtain particularly good focussing properties, it is advantageous when at least a transmitting or receiving element is arranged in the proximity of a focal point of the reflecting surface. A transmitting or receiving element is understood as being any light manipulating systems such as, for example, the end surfaces of glass fibres and optical wave guides, as well as focussing systems such as, for example, gradient refractive index structures or mirror optics, and also light-emitting structures such as, for example, LEDs or lasers, or light-receiving structures such as, for example, photo-diodes or electro-optical converters. The focal points of the curved surfaces correspond to the focal points of the imaginary hyperbola, parabola, or ellipse that the reflecting surface follows.

Thus, a parabola is, for example, defined as the number of points that are equidistant from a fixed point, the so-called focal point, and a fixed straight line, the so-called directrix. If parallel light falls parallel to the axis of rotation onto a parabolic reflector, all the light beams are imaged in one point, the focal point. The focal point can therefore also be determined independently of the mathematical construction.

In an analogous manner to this, the hyperbola is defined as the number of points for which the difference in distances from two given fixed points, the so-called focal points, is constant. Lastly, the ellipse is defined as the number of points for which the sum of the distances from two given points, the so-called focal points, is constant.

If, for example, the profile of the curved reflecting surface follows the shape of an imaginary parabola, and if the end of a transmitting element, for example, a glass fibre, is arranged in the proximity of the focal point of the imaginary parabola, the beams of light emanating from the glass fibre are reflected on the parabolic curved surface such that the reflected light beams are substantially parallel to one another.

It should be emphasised at this point that the coupling device is suitable for both feeding in and feeding out light in suitable light-conducting elements. Thus, for example, the coupling device with a curved reflecting surface profile in the shape of an imaginary parabola can also be used for focussing parallel light that is incident upon the curved reflecting surface at the focal point. In other words, all light that is incident upon the reflecting surface parallel at a right-angle is fed into a glass fibre located in the proximity of the focal point of the imaginary parabola.

In order to facilitate the calibration of, for example, a glass fibre in the proximity of the focal point of the curved surface, a particularly advantageous embodiment is provided with at least one limit stop for calibrating a transmitting or receiving element. This limit stop can, for example, be realised by means of a planar surface upon which the focal point of the curved surface lies. The glass fibre must then simply be laid on the planar surface in order to facilitate an exact calibration of the glass fibre in one direction. Embodiments are preferred, however, in which the limit stop allows calibration in at least two directions, or particularly preferred, in three directions.

It should be emphasised at this point that the at least one limit stop does not necessarily have to be a planar surface. For example, when the central axis of the light beam emergent from a transmitting or receiving element is not orientated perpendicular to the axis of rotation of the curved surface, the limit stop can advantageously be configured as a conical surface.

An embodiment of the coupling device is particularly preferred in which the limit stop is configured integrally with the reflecting surface. By means of the integral configuration, calibration of the limit stop in relation to the reflecting surface is unnecessary. Instead, care must simply be taken during manufacture to provide appropriately precise arrangement of the limit stop.

A particularly advantageous embodiment of the optical modifier provides at least one input and one output, wherein at least two feed devices are arranged such that the electromagnetic waves that enter at the input of the optical modifier, are firstly reflected at the first coupling device, then pass the wave-modifying element, and lastly are reflected at the second coupling device to the output. This arrangement is highly advantageous as it can be used, for example, to feed out light from a glass fibre via the first coupling device, to modify it with the aid of the wave modifying element, for example to filter out a wavelength channel, and to feed it into a further glass fibre again with the aid of the second coupling device. This arrangement requires no additional collimating electronics. By means of the reflecting curved surfaces, optimum focussing independent of the wavelength is ensured.

The arrangement is thus useful for a very wide range of wavelengths. Moreover, is it possible, for example, to carry out calibration with other wavelengths, for example with visible light, for simple, optimum calibration of the glass fibres. Because the optical path is visible to the person doing the calibration, said calibration can be performed with ease. After successful calibration, light from completely different wavelengths can be reflected without re-calibration being necessary.

A particularly preferred embodiment provides that the wave-modifying element is a frequency band reflector that reflects the electromagnetic waves in at least in one specific frequency interval. It is thus possible, for example, to focus the arriving optical signals via a first coupling device to the frequency band mirror, which in turn focuses at least some of the wavelength channels either directly to a further glass fibre, or firstly to a second coupling device, that in turn assures the feed out of the light in the returning glass fibres. With the aid of this arrangement, one or more wavelength channels can be selected from the optical signals.

Advantageously, the frequency band reflector is configured such that the electromagnetic waves transmit at a frequency outside a certain frequency interval. A third coupling device can then be provided advantageously, wherein the light coming from a first glass fibre is imaged via a first coupling device onto the frequency band reflector, that in turn reflects some of the wavelength channels, while it allows some other wavelength channels to pass so that the reflected wavelength channels are fed via a second coupling device into a first path-conducting glass fibre, and the transmitted wavelength channels are fed via a third coupling device into a second path-conducting glass fibre. Advantageously, a frequency band reflector or respectively a frequency band filter is used, a wavelength or a wavelength band transmitted, and all other wavelengths reflected.

Clearly, all the arrangements described here can always be used in both directions. Thus, the example described with three coupling devices and the frequency band reflector can also be used to feed two different signals of different wavelength channels, which are respectively transported via a separate glass fibre, into a common glass fibre.

An embodiment is particularly preferred wherein the wave-modifying element is a filter. In principle, this can be any light filtering element, however, neutral density filters, colour filters, polarising filters or an optical diode or respectively an optical isolator, are particularly preferred.

A neutral density filter weakens, for example, all the light beams of a particular frequency that pass through it Particularly when the individual wavelength channels are of extremely different intensity, the use of a neutral density filter after the de-multiplexer can be advantageous in somewhat weakening the higher intensity wavelength channels.

A colour filter is capable of filtering or respectively eliminating optical beams of a certain frequency or certain frequencies.

A polarising filter only allows optical beams to pass in a certain polarising plane.

An optical diode allows optical beams to pass in just one direction, while it does not allow any optical beams to pass in the other direction. An optical diode can be realised, for example, by two polarising filters, the polarising filter planes of which are, for example, tilted by approximately 45°, and between which a medium magnetised in the direction of the beam (magneto-optical medium) is found. If the optical beam passes through the appropriately magnetised medium there is a rotation of the polarisation plane of the light of, for example, approximately 45°, due to the Faraday effect. As the direction of rotation alters with the sign of the magnetisation, but independently of the direction of propagation of the light, the arrangement represents a non-reciprocal component that allows no light to pass in one direction, as the polarisation plane of the light passing through the first polarising filter, when it impinges upon the second polarising filter, is perpendicular to the polarisation plane of the second filter, while in the other direction light can transmit as, because of the magnetised medium, the tilting of both polarisation planes of the two filters is neutralised.

An embodiment is particularly preferred in which the wave-modifying element is a switch, preferably an on/off switch, a reflecting/transmitting switch, or a selection switch. An on/off switch serves to selectively allow or not allow several wavelength channels to transmit. A reflecting/transmitting switch serves to selectively allow one or more wavelength channels to be transmitted or reflected. Lastly, a selection switch serves to guide one or more wavelength channels selectively in one direction or the other. The selection switch can be realised, for example, by means of a prism that, if required, can be inserted into the beam path.

The present invention also relates to a method for manufacturing an optical modifier. It is therefore also the object of the present invention to provide a method that allows an optical modifier to be manufactured inexpensively and above all with a high degree of accuracy.

According to the invention, this object is solved in that the coupling device of the optical modifier is produced, at least along one section, as a rotational solid, that in profile follows a cone section. This has the advantage that the curved surface can be manufactured, for example, by means of turning or milling and/or polishing, preferably from solid material. By means of turning or milling, highly precise configuration of the reflecting surface is possible. Clearly, the curved surface can also be approximated by small, planar surfaces that fit together in the manner of facets.

The material from which the coupling device of the optical modifier is manufactured can be almost a free choice. Particularly preferred use is made of copper or glass, optionally also silicon or another material with a high degree of heat conductivity and low thermal expansion coefficients.

When the material is preferably selected such that it reflects in the range of the reflecting surface for the desired wave range, it is clearly also possible to produce the coupling device from a transparent material and to vapour deposit a reflecting layer, for example, a metal layer, in the reflecting range. According to the application, it can be advantageous when the reflecting surface is coated and/or polished.

A particularly advantageous embodiment provides that a limit stop surface is turned perpendicular to the axis of rotation of the reflecting surface, in the same clamp in which the reflecting surface (or respectively the negative or original thereof) is turned. This limit stop surface serves for calibration of the transmitting or receiving element in the proximity of a focal point. In this case too, the configuration of reflecting surface and limit stop surface is not only time-saving, but also leads to a highly accurate relative positioning of the limit stop surface with respect to the reflecting surface. The accuracy of the coupling device is therefore substantially determined by the quality of the turning tool and the positioning device of the turning machine. The generally manual calibration of the turning tool in the tool holder and of the workpiece in the workpiece holder, on the other hand, does not have to be done exactly, as in the manufacture of the coupling device it is not absolute precision, but simply the exact positioning of the limit stop surface relative to the reflecting surface that is relevant.

For many applications, in particular for the manufacturing of large numbers of pieces, it can be advantageous when a negative of the turned or milled part is produced and the coupling device is manufactured by subsequent moulding. This has the advantage, on the one hand, that the time-consuming turning or milling process only has to be done once. Afterwards, with the aid of the mould, in principle any number of coupling devices can be manufactured. On the other hand, moulding has the advantage that the selection of material for manufacturing the coupling device is significantly increased. By means of the moulding technique, the turning process no longer has to be taken into consideration. It is possible, for example, to fabricate the coupling device from, for example, plastics or glass by means of injection moulding, hot stamping, hot pressing or casting.

The negative is preferably manufactured directly as a turned or milled part.

A particularly advantageous embodiment provides that before moulding on the negative, an area is set out so that the moulded positive has at least one further limit stop. Because the at least one further limit stop is configured on the negative, the manufacture of said at least one further limit stop is simplified. Were it desired to affix the further limit stop onto the turned or milled part, said stop would have to be welded or screwed on, as because of the fabrication of the first limit stop by means of turning or milling, all the material that could be used for the further limit stops is inevitably removed.

Clearly, for example in the case of the embodiment with ellipse-shaped reflecting surfaces, limit stops in the proximity of the focal point could also be provided.

Where several coupling devices are to be arranged adjacently, advantageously a common mould part is manufactured that has several coupling devices already orientated towards one another. By means of the one-off manufacturing of a moulding tool, that already includes several (at least two) moulding tools for coupling devices orientated towards one another, the optical modifier can be produced inexpensively in large numbers.

Preferably, two mould parts are manufactured that each have at least two coupling devices and have simply to be arranged at the correct distance apart from one another and with respect to at least one wave-modifying element.

Advantageously, the distance apart of the two parts of the mould from one another is determined in that spacers are arranged, preferably integrally, on the mould parts.

Two mould parts with spacers arranged on two opposite sides of a plate are particularly preferred. The plate is transparent for the wavelength range to be transmitted. The embodiment with the plate additionally has the advantage that at least one wave-modifying element can be arranged on the plate.

The mould parts with spacers and integrated coupling devices can be manufactured very inexpensively in large numbers. The plate, for example, a glass plate, is also inexpensive. By means of the arrangement according to the invention, passive calibration of the optical modifier is possible, that is to say the individual parts are simply put together and the transmitting and receiving elements arranged with the aid of the limit stops. Fine manual calibration dependent upon the transmitted intensity of the optical modifier, as was standard in the case of known modifiers, is unnecessary.

Further advantages, features, and possibilities for application of the present invention will become evident from the following description of preferred embodiments, and the attached drawings.

In these is shown, in

Figure 4A:
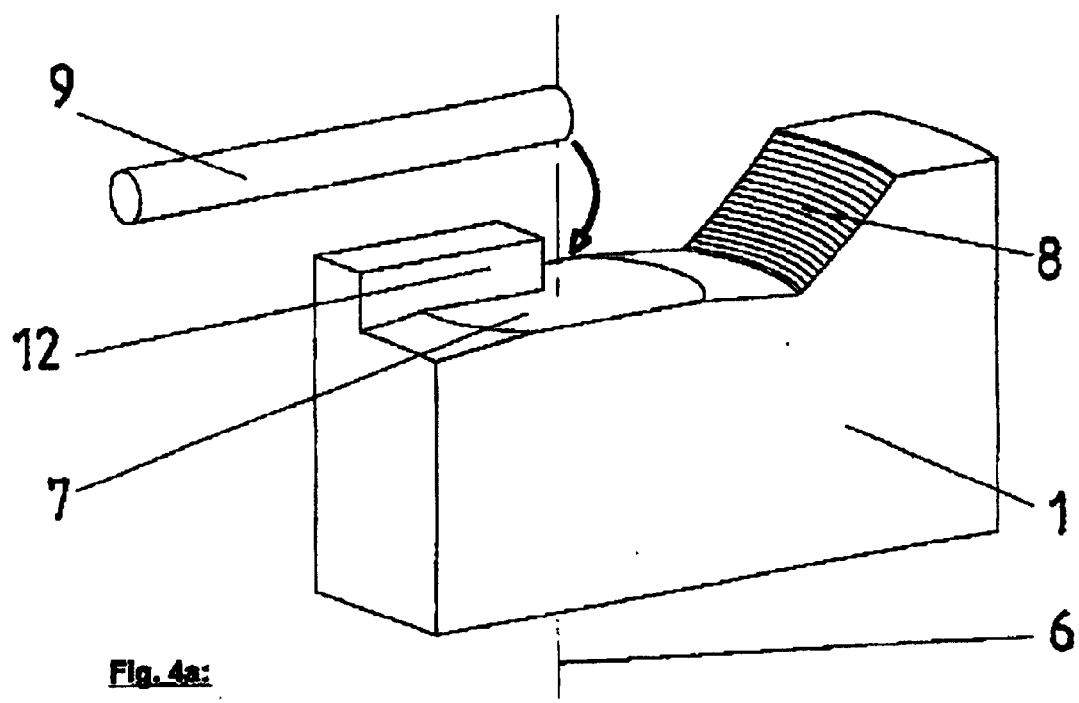
Figure 6:
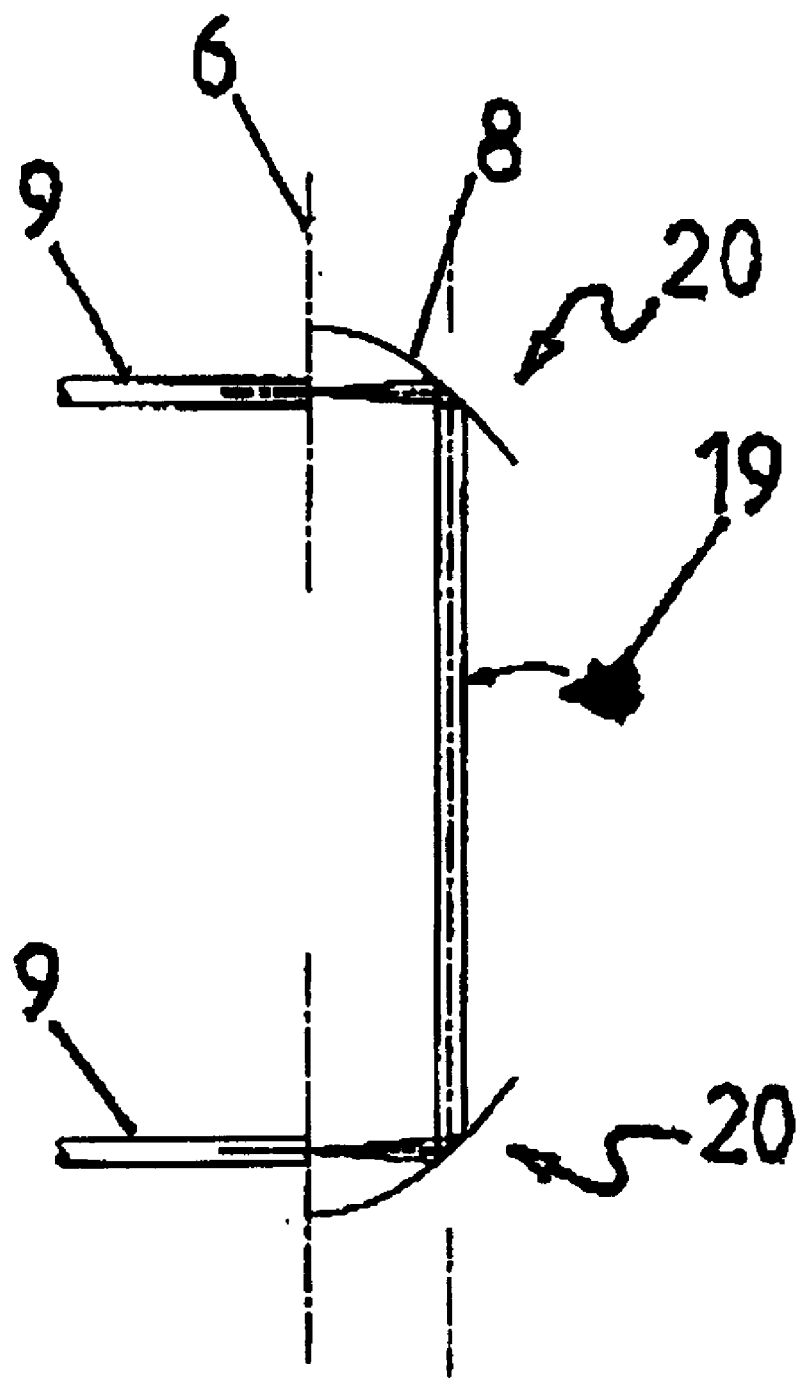

FIGS. 1a–d a first embodiment of the coupling device as used in the optical modifier according to the invention, in a schematic view, a sectional view, a plan view, and a perspective view, FIGS. 2a–d a second embodiment of the coupling device, in a schematic view, a sectional view, a plan view, and a perspective view, FIGS. 3a–d a third embodiment of the coupling device, in a schematic view, a sectional view, a plan view, and a perspective view, FIGS. 4a and b a fourth embodiment of the coupling device in two perspective views, FIGS. 5a–d a fifth embodiment of the coupling device in a schematic view, a sectional view, and two perspective views, FIG. 6 a first embodiment of the optical modifier, FIGS. 7 to 14 further embodiments of the optical modifier, FIGS. 15 to 21 several views of a particularly compact embodiment.

Figure 22:
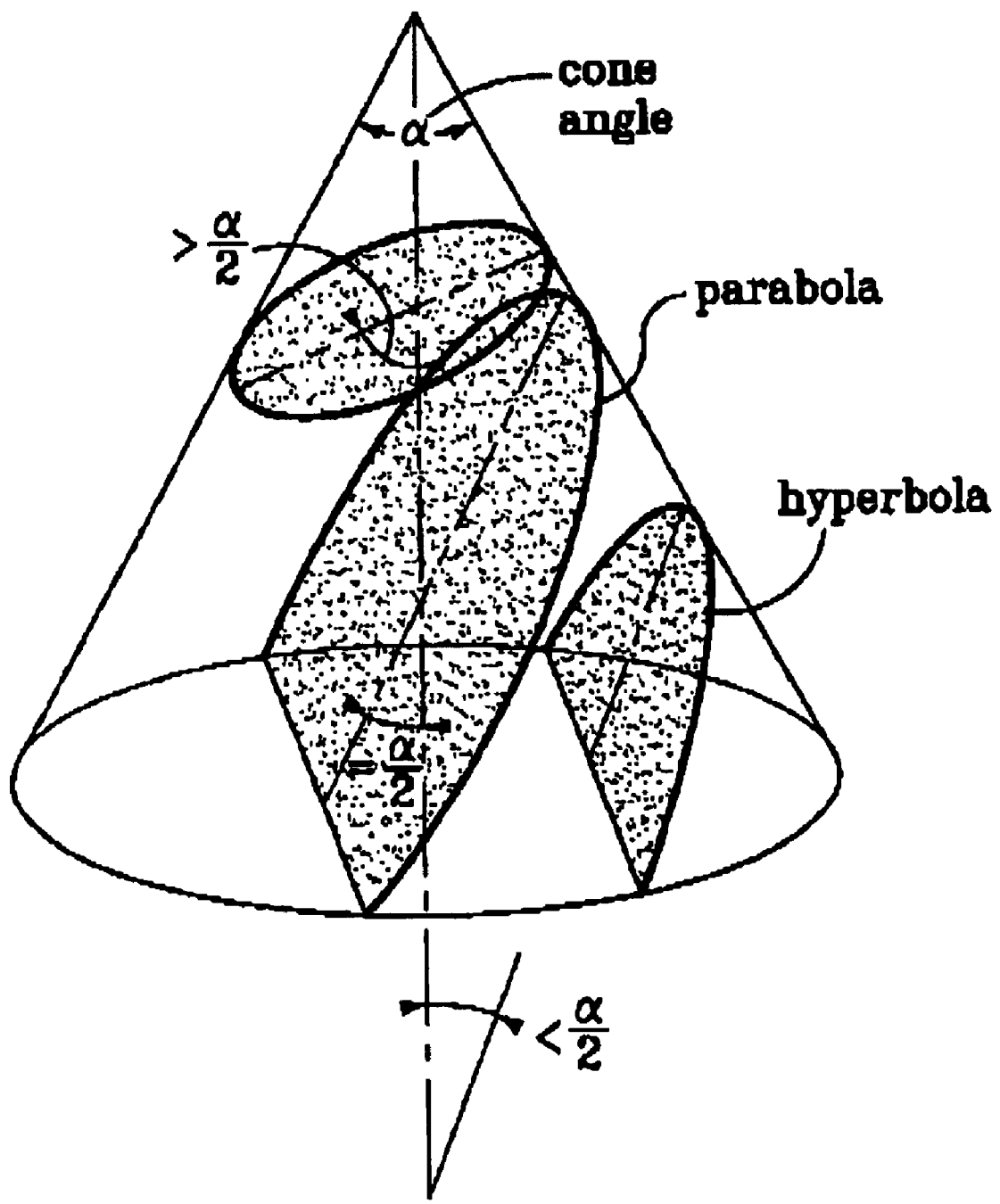

FIG. 22 a cross-sectional view showing various cuts described,

FIG. 23 a block diagram of manufacturing method described, and

Figure 24:
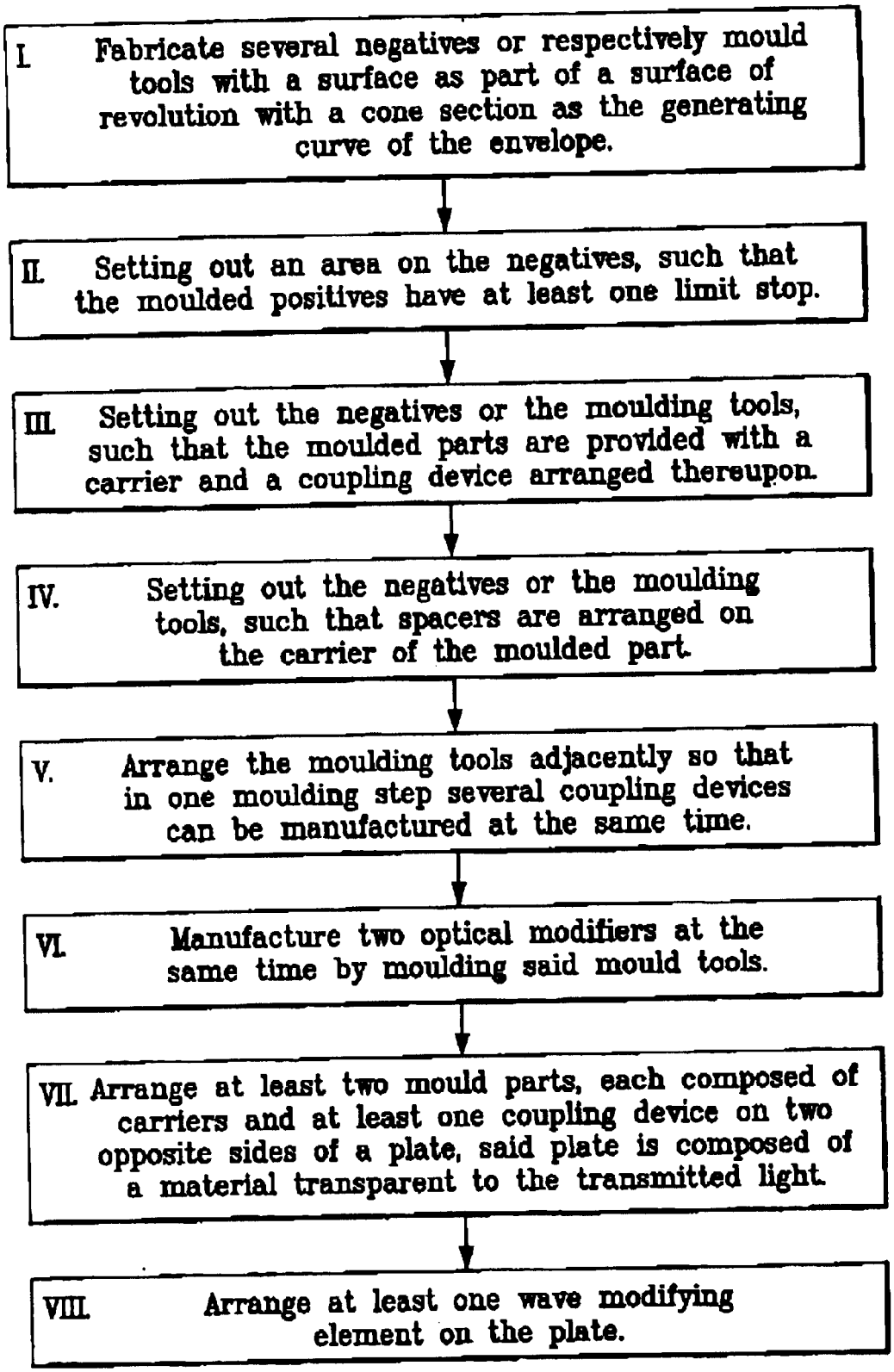

FIG. 24 a more detailed block diagram of the manufacturing method.

Figure 1B:
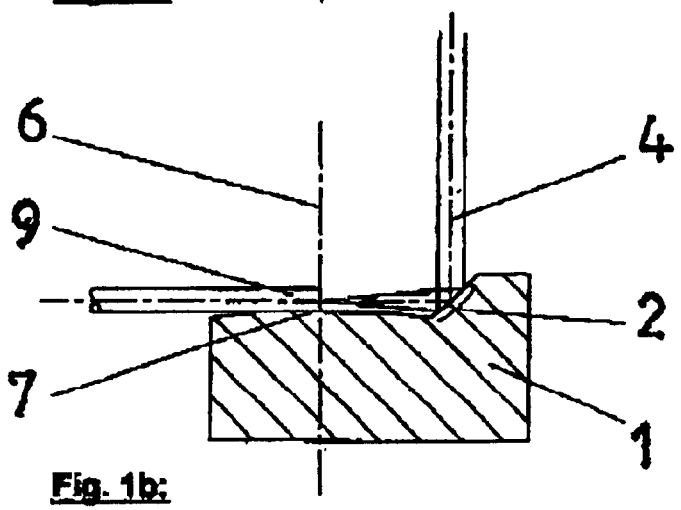
Figure 1C:
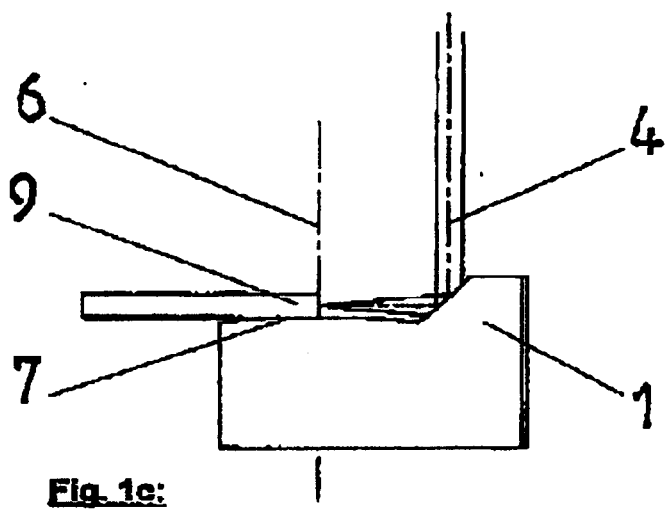

The coupling device that is used in the optical modifier according to the invention will be explained firstly. In FIGS. 1a to 1d there is thus shown a first embodiment of the coupling device according to the invention. Firstly, in FIG. 1a, the diversion principle is demonstrated. A reflecting surface 2 has a profile following the shape of a parabola 5. Perpendicular to the plane of the parabola 5, the curvature of the surface 2 is circular, as it forms the segment of the surface of a rotational solid. At the focal point B of the parabola, an optical beam 3 expands, which beam impinges upon the reflecting surface 2, and leaves the coupling device as a reflected beam 4. Clearly, the beams emergent from the focal point B are focussed to infinity by the coupling device. With the arrangement shown here, the angle between the incident optical beam 3 and the emergent optical beam 4 is approximately 90°. In FIGS. 1b and 1c a section through the first embodiment and respectively a side view are shown. The coupling device is composed of a basic body 1, that has a reflecting surface 2. Furthermore, a limit stop 7 is provided that serves to receive a glass fibre. If the glass fibre 9 is laid on the limit stop surface 7 such that it ends in the axis of symmetry of the parabola 5, provided there is a suitable arrangement of the limit stop surface 7, the end surface of the fibre 9 lies approximately at the focal point B.

Figure 1D:
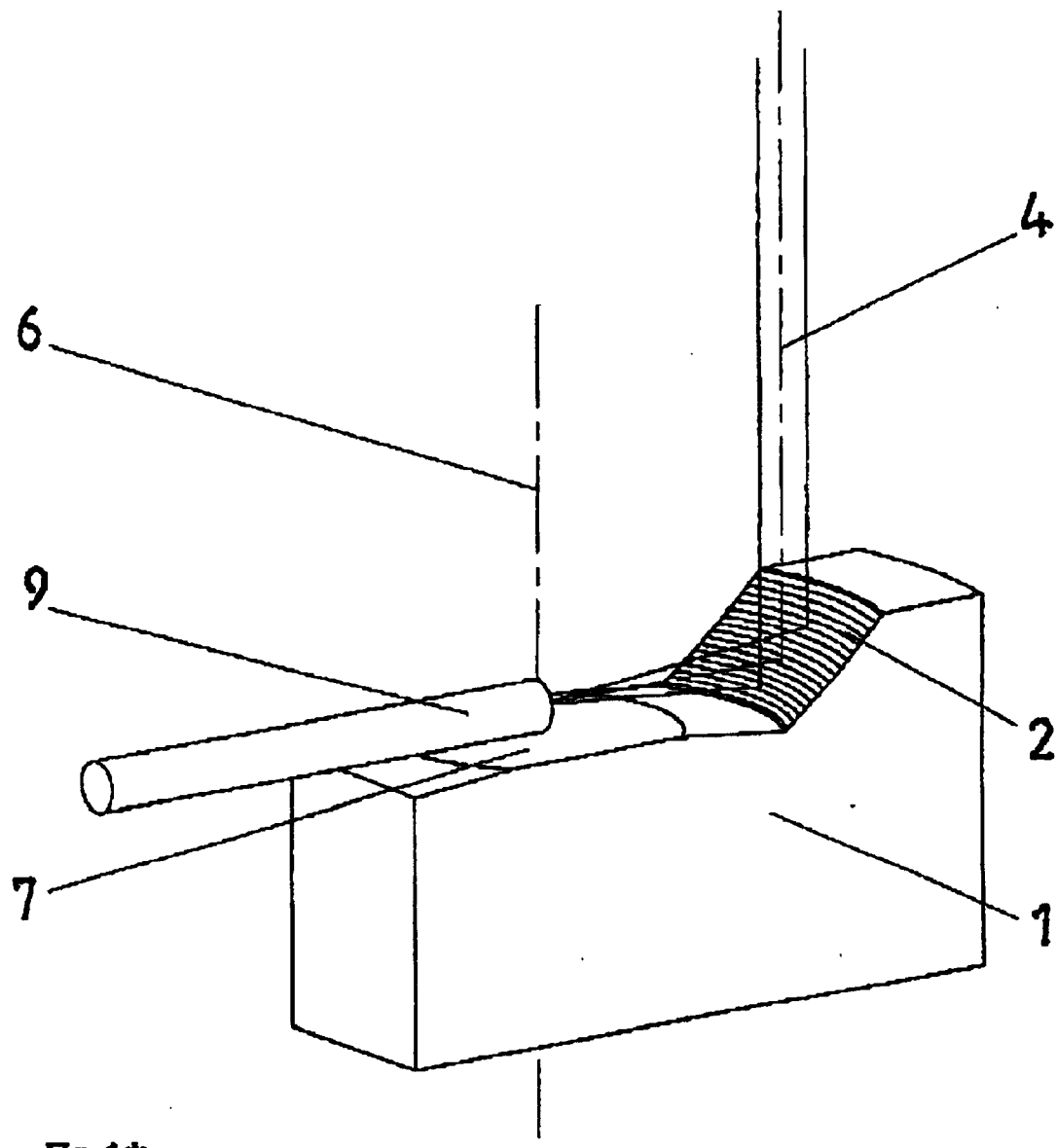
Figure 2A:
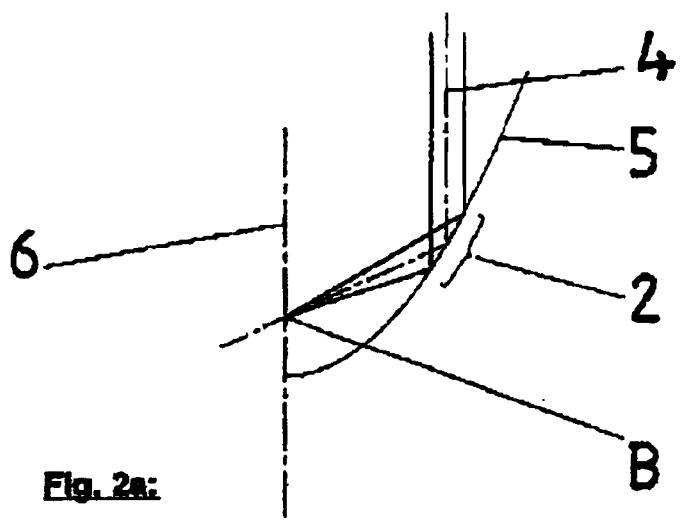
Figure 2B:
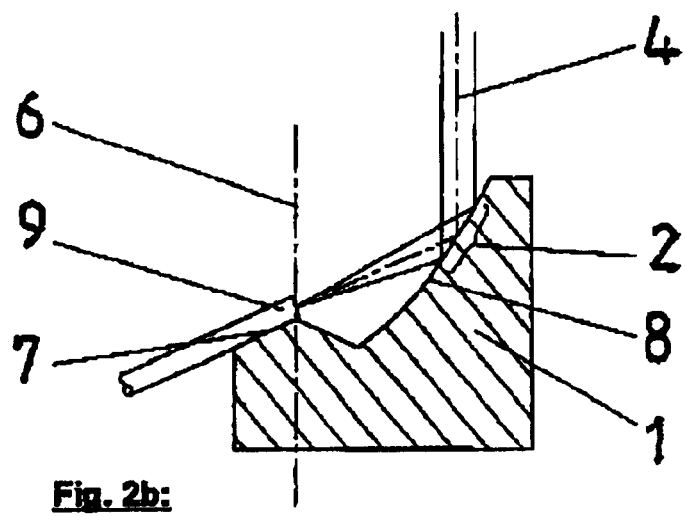
Figure 2C:
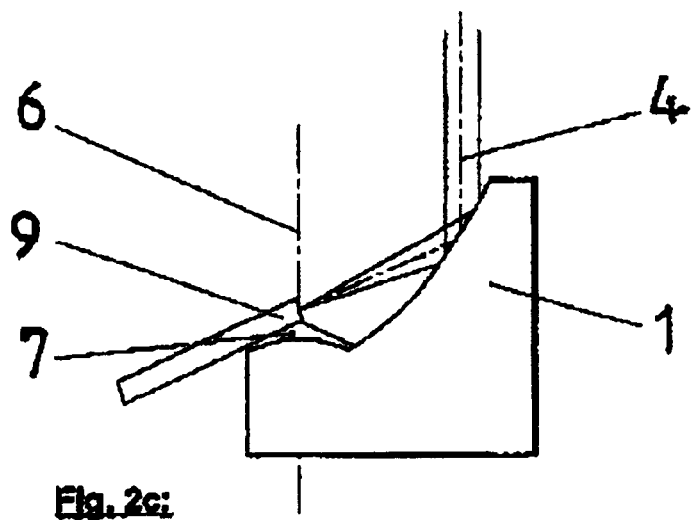
Figure 2D:
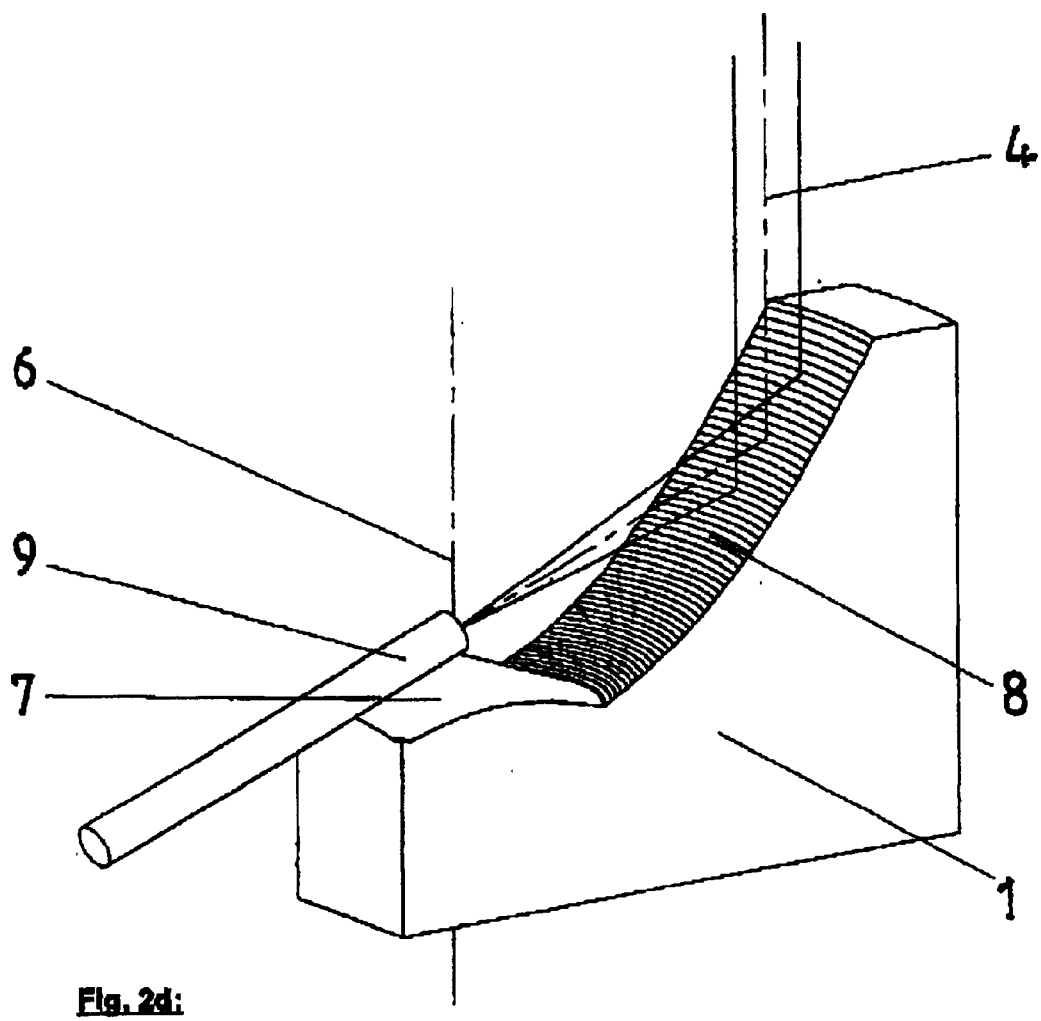
Figure 3A:
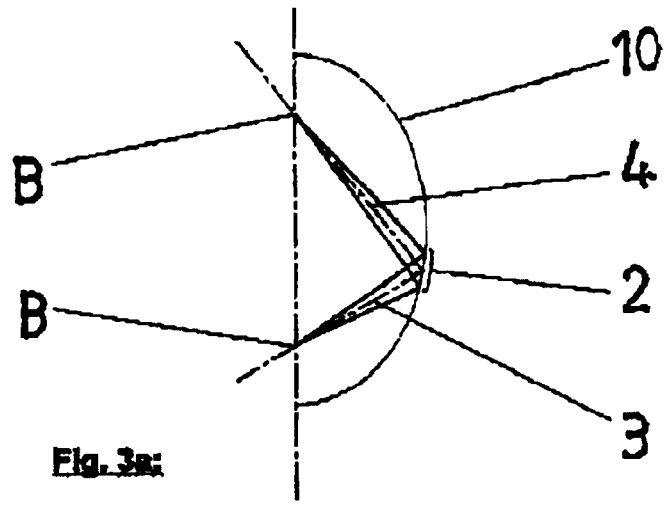
Figure 3B:
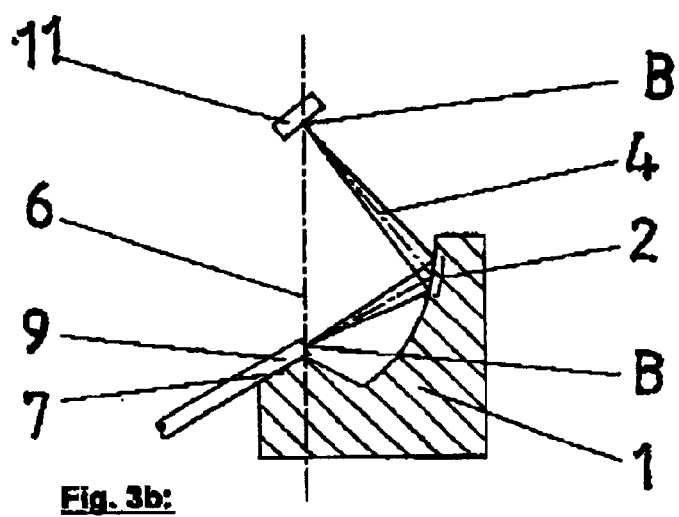
Figure 3C:
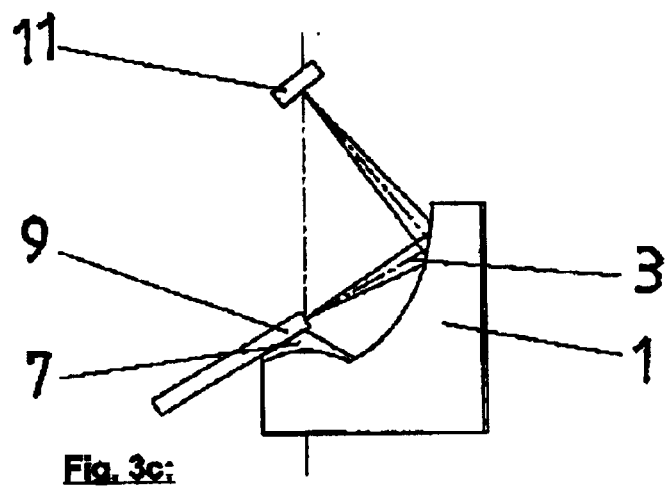
Figure 3D:
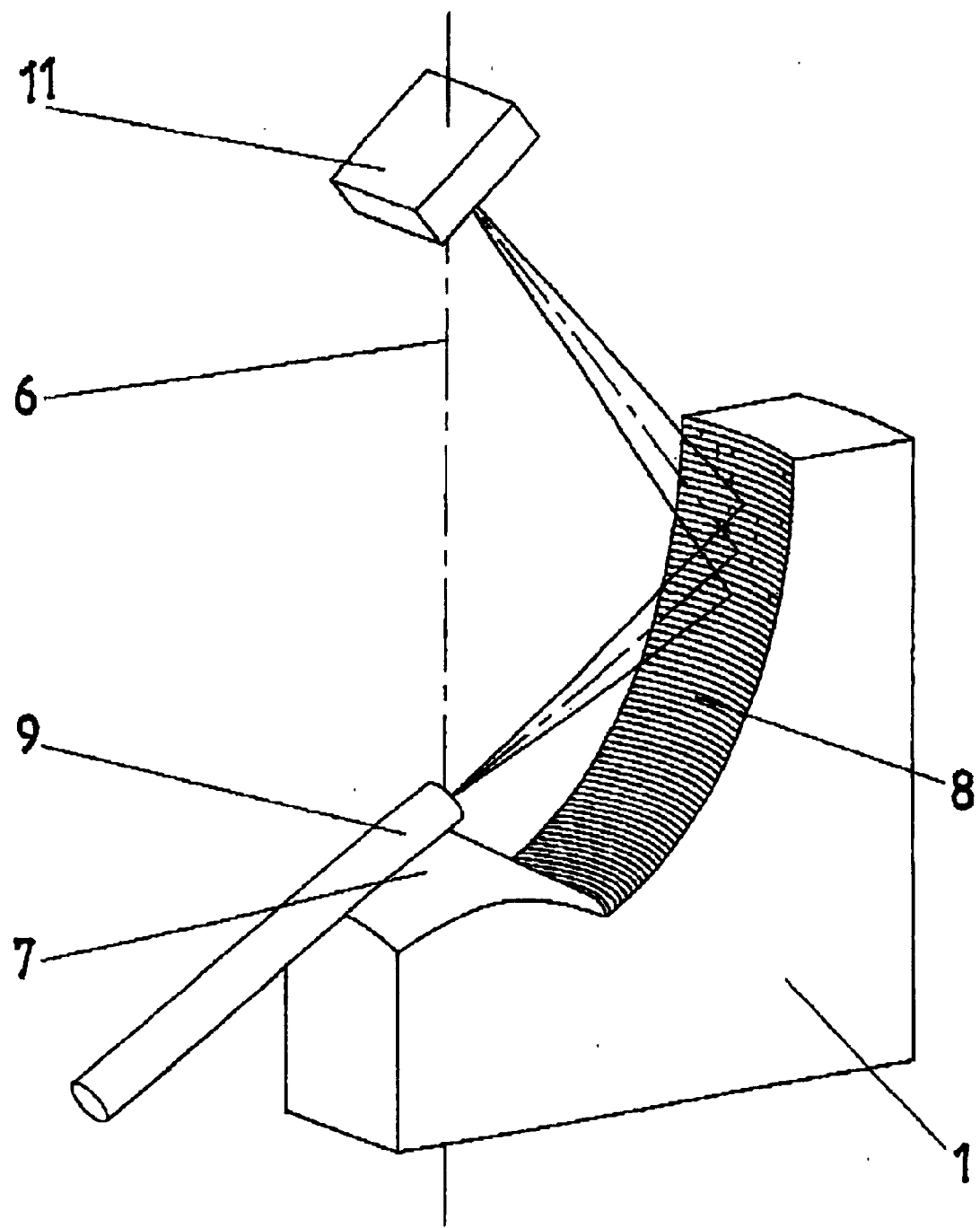

FIG. 1d shows a perspective view of the coupling device. It is apparent that the reflecting surface 2 follows the shape of a paraboloid of revolution. By means of coupling device shown here, light passing through the glass fibre 9, that emerges in a divergent manner at the end of the glass fibre, can be deflected by approximately 90° and then runs approximately parallel. Clearly, the parallel properties of the reflected optical beam 4 are better the more exactly the fibre end surface of the glass fibre 9 is arranged at the focal point B. In order to enable the best possible positioning without complicated calibration, a limit stop 7 is provided that is arranged such that the fibre end surface of the glass fibre 9 is exactly at the level of the focal point B when said fibre end surface is lying on the limit stop surface 7. By means of displacing the glass fibre 9 on the limit stop surface 7, the fibre end surface must simply be positioned such that it lies approximately on the axis of rotation 6 of the paraboloid of revolution of the reflecting surface 2. As can be seen in the embodiment shown in FIGS. 2a to 2d, the divergent optical beam 3 light emerging from the glass fibre 9 does not necessarily have to be perpendicular to the axis of rotation 6, but can, for example, also be tilted. It is simply important that the divergent optical beam emerges approximately at the focal point B of the parabola. It does not matter where the point of incidence 2 of the beam 3 to be reflected impinges upon the reflecting surface 8.

In order to facilitate understanding of the optical modifier, it should be stated expressly at this point that with all the embodiments shown, the beam path can also go in the opposite direction. It is thus possible to feed light into a glass fibre 9 arranged in the proximity of the focal point, which light impinges upon the reflecting surface 8 parallel to the axis of rotation 6.

In FIGS. 3a to d, a third embodiment of the coupling device is shown. As is evident from the schematic diagram of FIG. 3a, in this case the reflecting surface 2 follows the shape of an ellipse 10. The consequence of this is that light from one focal point B of the ellipse that impinges in a divergent manner on the reflecting surface 2 is focused at the other focal point B. This embodiment is thus particularly suitable for coupling light from one glass fibre end into the end of another glass fibre. The (polished) end surfaces of the respective glass fibres must simply be arranged at the focal point B of the ellipse.

Figure 4B:
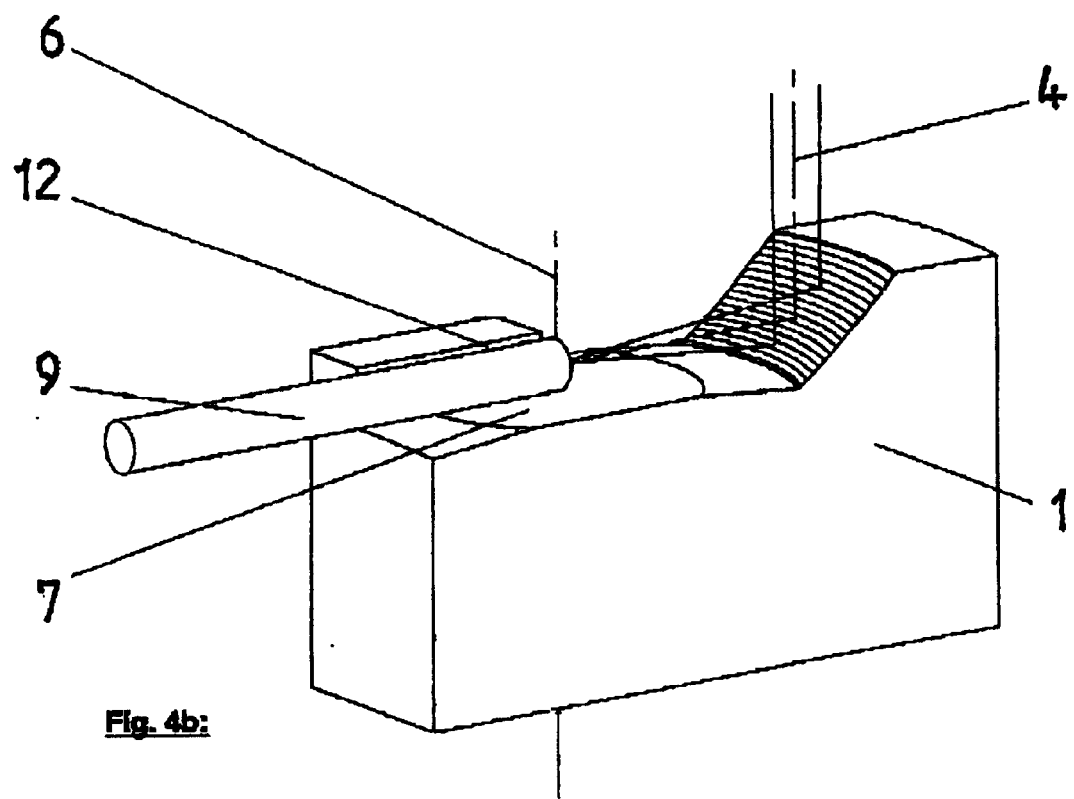

As already described, a limit stop surface 7 is provided for the exact positioning of the glass fibre in the direction off the axis of rotation 6. As is indicated by the arrow in FIGS. 4a and 4b, the glass fibre 9 must simply be laid on the limit stop surface 7 in order to obtain calibration of the glass fibre in the direction of the axis of rotation 6. In the embodiment shown in FIGS. 4a and b, a further limit stop 12 is shown that allows calibration of the fibre in the direction of a line that runs perpendicular to the axis of the fibre and perpendicular to the axis of rotation 6. By means of the limit stop 12, calibration is yet again significantly simplified. Complex calibration is unnecessary as the glass fibre 9 simply has to be laid on the two limit stops 7, 12. Calibration or respectively positioning is only still done in the direction of the axis of the fibre. This calibration can take place, for example, with the aid of an optical marker on the basic body 1. As the optical modifier according to the invention is independent of wavelengths, calibration can also take place using visible light in cases where signal transmission is planned using non-visible light. The beam path can then be traced by eye by the person doing the calibration and adjustment is easily possible. If the coupling device is then operated with light of other wavelengths, no re-calibration is necessary. With the known coupling arrangements with two GRIN lenses and a mirror, on the other hand, calibration must inevitably be attuned to the wavelength, so in general calibration by eye is not possible.

Clearly, it is also possible to provide a third limit stop that, for example, extends approximately perpendicular to the second limit stop 12, and, for example, form a kind of nose, so for exact positioning the glass fibre 9 is firstly brought into contact with the limit stop surfaces 7 and 12, and then the glass fibre 9 is moved in the direction of the reflecting surface 8 until the end surface of the glass fibre touches the third limit stop surface that has the shape of a flat step. Care is to be taken that, to the extent that the stop is not transparent, it should not cover the light conducting core of the fibre end surface.

In FIGS. 5a to d a fifth embodiment is shown in which the reflection takes place within a transparent basic body 1 because of total internal reflection at the transition of an optically thicker to the optically thinner medium. The reflection principle is shown schematically in FIG. 5a, and substantially corresponds to FIG. 3a. The light emergent from the fibre end surface of the glass fire 9 impinges upon the focal point B in the transparent basic body 1. The light travels within the basic body 1 until it impinges upon the curved external surface 2. Because of the transition between the optically denser medium to the optically thinner medium, total internal reflection occurs here. The reflected optical beam lastly emerges at an angle from the basic body 1 in which the total internal reflection takes place.

With this embodiment too, the light emergent at one focal point B from the glass fibre 9 is focussed at the other focal point B. It is clearly evident that here also, several limit stops are provided. Thus, for example, the limit stop surface 7 is provided to serve as a positioning limit stop for the glass fibre 9 in the direction of the axis of rotation 6. A limit stop 13 is provided in the direction of the axis of the fibre.

A first embodiment of an optical modifier according to the invention is shown in FIG. 6. Two coupling devices 20 are clearly shown, as have already been described with reference to the preceding Figures, at the focal point of which the fibre end surface of a glass fibre 9 is located. The reflecting surface 8 of the coupling device 20 here has a profile in the shape of a parabola, so the light expanding as a beam from one focal point B is reflected by the coupling device 20 such that it is substantially parallel. The two coupling devices are arranged such that that light emergent from one glass fibre 9 is firstly reflected on one coupling device 20 and then impinges as a parallel optical beam upon the second coupling device that images the optical beam directly on the fibre end surface of the second glass fibre 9. By means of the arrangement of the two coupling devices 20, all the light that emerges from one glass fibre 9 is focussed on the fibre end surface of the other glass fibre 9, and vice-versa. A wave-modifying element 19 is schematically arranged, which in principle can be of any shape and is placed in the optical beam. By specific arrangement of one or more wave-modifying elements in the beam path, the transmitted signal can be modified, for example, by shading.

Figure 7:
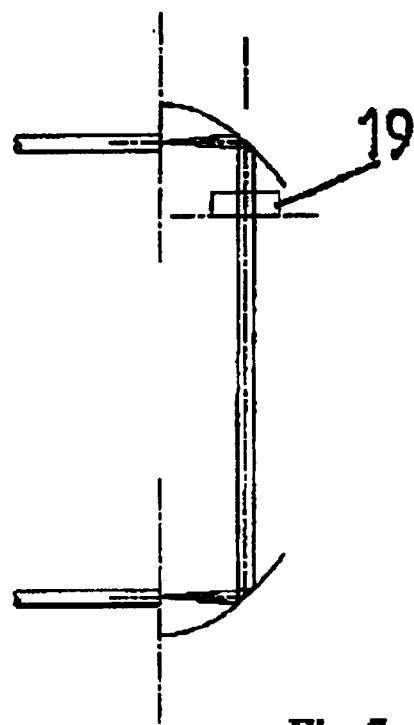

In FIG. 7, another embodiment of the optical modifier is shown. The wave-modifying element 19 is in this case a substantially planar structure that can reflect some or all of the light, while some of the light can be transmitted (for example, a narrow band filter). With this arrangement, it is possible, for example, to select one or more wavelength channels from a glass fibre that carries information signals on several wavelength channels, which selected signals can be fed into the other glass fibre.

Figure 8:
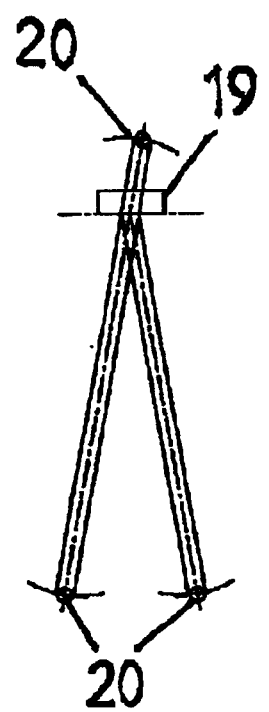

In FIG. 8 a further embodiment of an optical modifier is shown which in this case is a simple embodiment of a multiplexer. Here, three coupling devices 20 and a wave-modifying element 19 are arranged. If, for example, information with two wavelengths, that is to say on two wavelength channels, is transmitted by the coupling device at the bottom left in FIG. 8, the wave-modifying element 19 ensures that a wavelength channel, that is to say a frequency, can transmit, so that this wavelength channel on the upper coupling device 20 is fed into an appropriately prepared glass fibre, and the other wavelength channel is reflected at the wave-modifying element 19 so it is fed via the coupling device at the bottom right into another glass fibre.

Clearly, with all the embodiments, glass fibres do not necessarily have to arranged on the coupling device 20, but instead, for example, electro-optical converters that convert the optical information signals into electrical signals, can be provided.

The embodiment of FIG. 8 can be used not only as a de-multiplexer, but also as a multiplexer. If, for example, there are two different information signals of different wavelength channels present on two different glass fibres, one wavelength channel can be fed via the coupling device at the bottom right, and the other wavelength channel via the coupling device at the top in FIG. 8. While one wavelength channel is directly transmitted to the coupling device at the bottom left in FIG. 8, wherein it passes through the wave-modifying element 19, the other wavelength channel is reflected at the wave-modifying element 19 and transmitted to the coupling device at the bottom left in FIG. 8.

Figure 9:
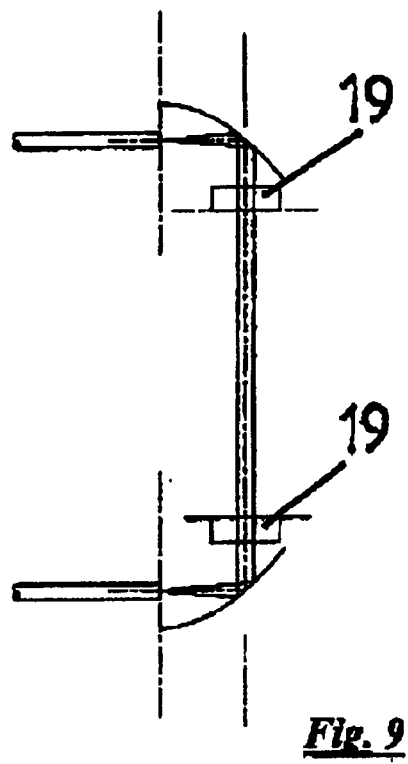

In FIG. 9, there is shown in a side view and a sectional view a somewhat more complex embodiment of a multiplexer/de-multiplexer. This embodiment has six coupling devices 20 and four wave-modifying elements. Only the mode of operation as a de-multiplexer will be explained with reference to this embodiment, wherein the multiplexing function is provided by the beam travelling in the opposite direction.

Figure 10:
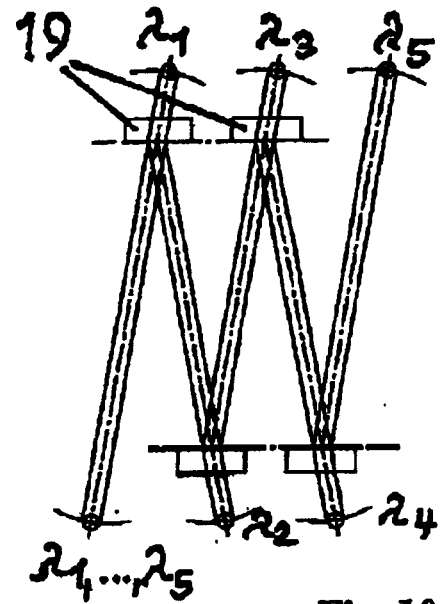

If, for example, a glass fibre carries information signals from five different wavelength channels with the wavelengths $\lambda_1, \lambda_2, \lambda_3, \lambda_4$ and $\lambda_5$, and if the light in this glass fibre is fed via the coupling device 20 at the bottom left in FIG. 10 into the de-multiplexer, the light is made parallel, and impinges upon the wave-modifying element 19 at the top left in FIG. 10. This wave-modifying element 19 is configured such that it only allows one wavelength channel, that is to say light with the wavelength $\lambda_1$, to pass, while all other wavelengths are reflected. As a consequence, only one channel, that is to say information signals with the wavelength $\lambda_1$, are received on the coupling device at the top left in FIG. 10. The signal reflected by the wave-modifying element 19 at the top left in FIG. 10 now contains only signals with the wavelengths $\lambda_2, \lambda_3, \lambda_4$ and $\lambda_5$. This reduced signal impinges on the wave-modified element at the bottom left in FIG. 10. This wave-modifying element 19 is configured such that only information signals with the wavelength $\lambda_2$ are allowed through, while all other wavelengths, that is to say the wavelengths $\lambda_3, \lambda_4$ and $\lambda_5$, are reflected. This principle is continued with the further wave-modifying elements 19, so that the five wavelength channels that were originally transmitted by a single glass fibre are separated by the de-multiplexer arrangement onto five different glass fibres.

Figure 11:
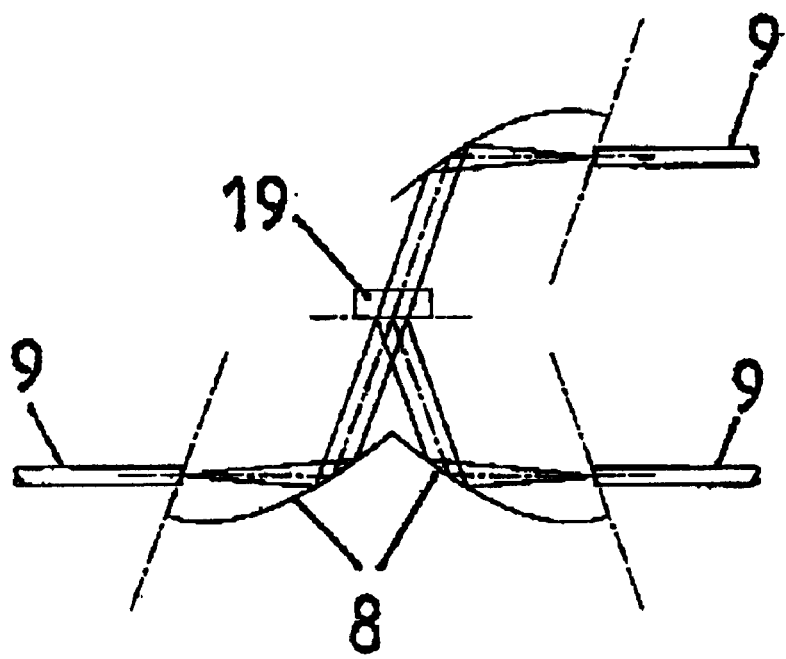

In FIG. 11, a further embodiment of a multiplexer/demultiplexer is shown. The use of the coupling devices 20 additionally has the advantage that the entire arrangement is very compact, and the light or respectively the glass fibres can be conducted in almost any desired orientation from the optical modifier. It should be emphasised again at this point that all the embodiments can be used with the beam travelling in the opposite direction. Naturally, bi-directional applications are also possible. Thus, with an arrangement as shown in FIG. 11, for example, signals with the wavelength $\lambda_1=1.31$ μm can be fed via the coupling device at the top right in FIG. 11 into the glass fibre at the bottom left. At the same time, for example, information with the wavelength $\lambda_2=1.55$ μm is received by the glass fibre at the bottom left via the coupling device at the bottom right.

In the arrangement shown in FIG. 11, all the glass fibres are parallel and arranged in one plane, the image plane. However, an arrangement is conceivable in which from one side one or more glass fibres that carry several wavelength channels are guided by means of a plug to the optical modifier, and parallel to this, on the other side, for example in the form of a plug, several glass fibres are made available that are provided for receiving the individual wavelength channels.

Figure 12:
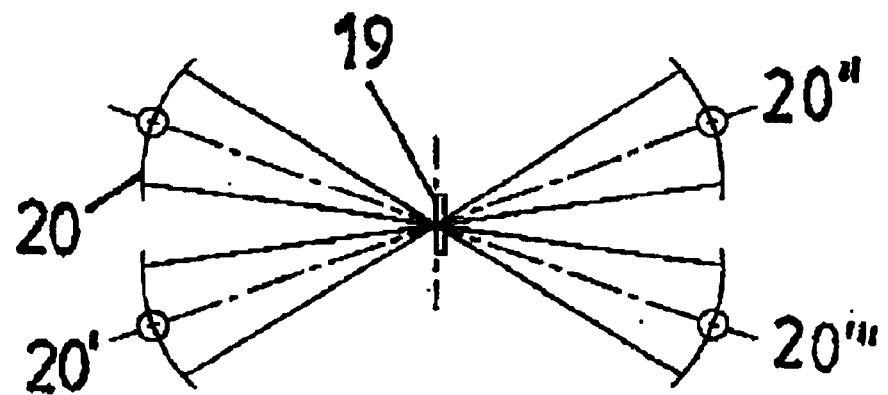
Figure 13:
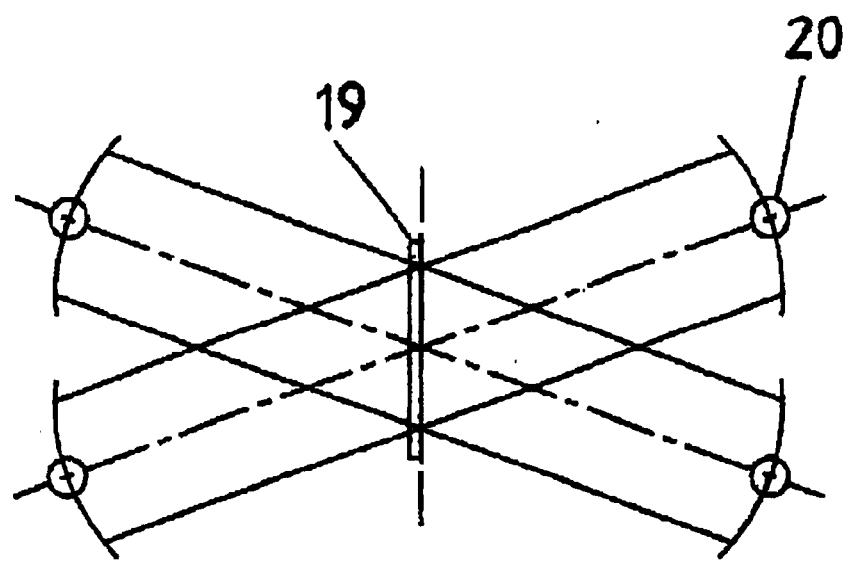

In FIG. 12, there is lastly shown a further arrangement of the optical modifier according to the invention, in which the wave-modifying element is a switch. This switch 19 can be configured, for example, such that when required it can be placed in the beam path or removed from it. In the embodiment shown, it is clear that here, the coupling devices have a curved surface, the profile of which substantially follows an ellipse, so the beams emergent from the coupling devices are not imaged parallel, but instead at the focal point of the curved surface. The switch 19 is arranged at the focal point 19. With this 2×2 switch arrangement with a focus point, the arrangement of the coupling devices with respect to one another must be done very accurately. The embodiment shown in FIG. 13 of a 2×2 switch arrangement without a focus point has only small requirements for accurate relative arrangement of the coupling devices with respect to one another. The 2×2 switch arrangement with a focus point has the advantage, however, that in this case exact positioning of the actuator, that is to say of the connecting wave-modifying element, can be taken into account, while with the 2×2 switch arrangement without a focus point, a non-exact arrangement of the actuator can weaken the intensity of the information signal.

Figure 14:
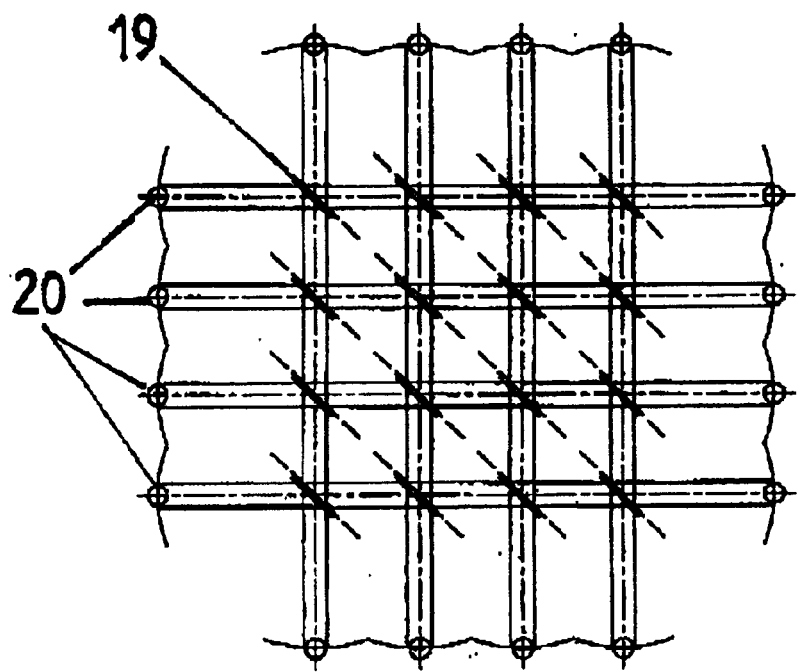
Figure 15:
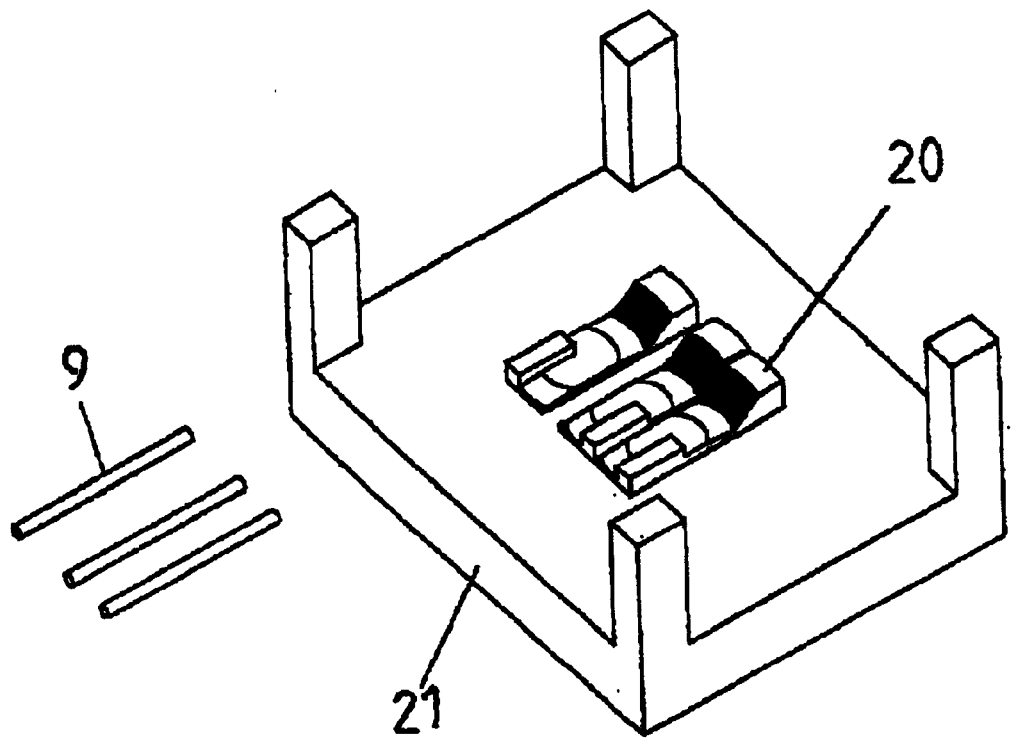

For example, in FIG. 14 a further embodiment of the optical modifier is shown, that includes a total of 16 coupling devices 20, and 16 wave-modifying elements 19. It is clear that by means of the optical modifier according to the invention, a large number of channels of different wavelengths or the same wavelength can be connected in the smallest of spaces. In particular by using the special coupling devices in the optical modifier, it is now possible in the smallest of spaces to deflect the light path by reflection around an angle. In particular in optical telecommunications and data communications, this results in a substantially more compact design of the systems used.

FIGS. 15 to 21 show the construction of a multiplexer/de-multiplexer. The multiplexer/de-multiplexer corresponds to the embodiment shown schematically in FIG. 10. The important element is the carrier 21 shown in FIG. 15, with three coupling devices 20. In the embodiment shown, the carrier 21 and the coupling devices 20 together form a mould part. In other words, the carrier body 21 and coupling devices are configured in one piece.

Figure 16:
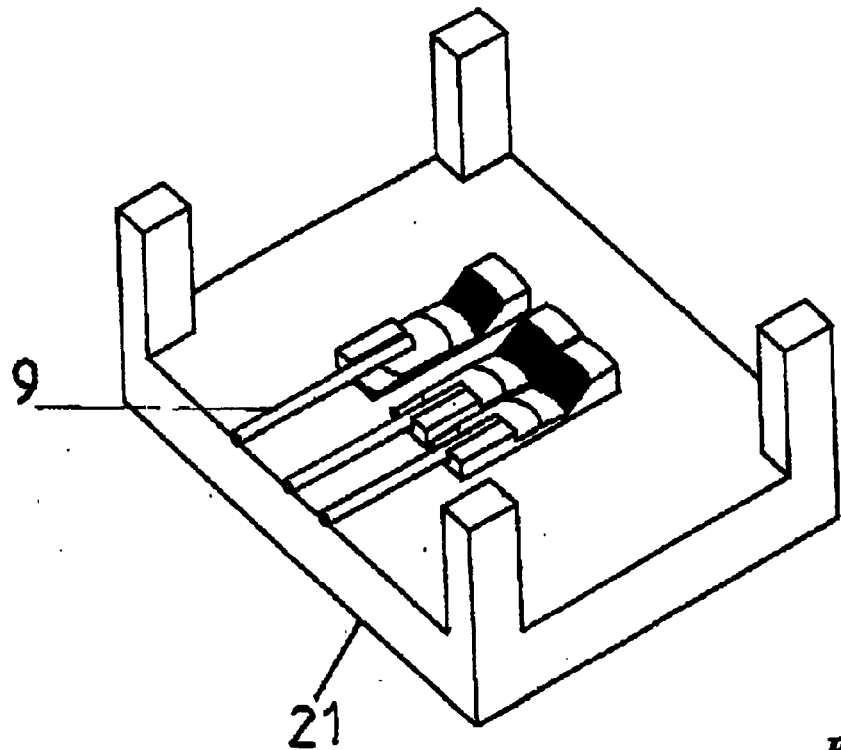

The coupling devices 20 are provided with two limit stop surfaces that serve to receive, for example, a glass fibre 9, as shown in FIG. 16.

Figure 17:
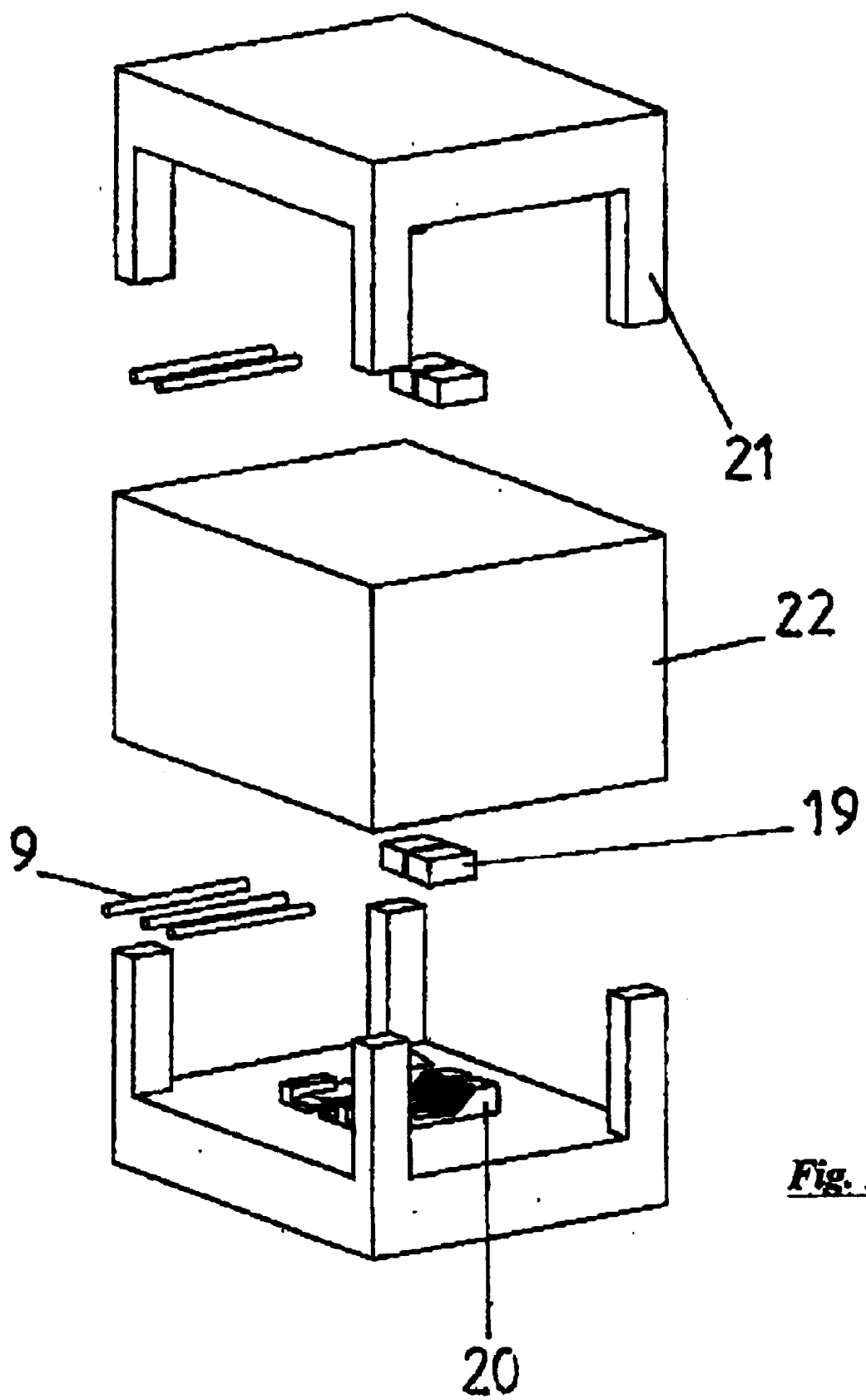

In FIG. 17 an exploded diagram of the multiplexer/de-multiplexer is shown. It is composed of two carriers 21 with coupling devices 20, four wave-modifying elements 19 that in this case are configured as frequency band reflectors, and a glass plate 22.

Figure 18:
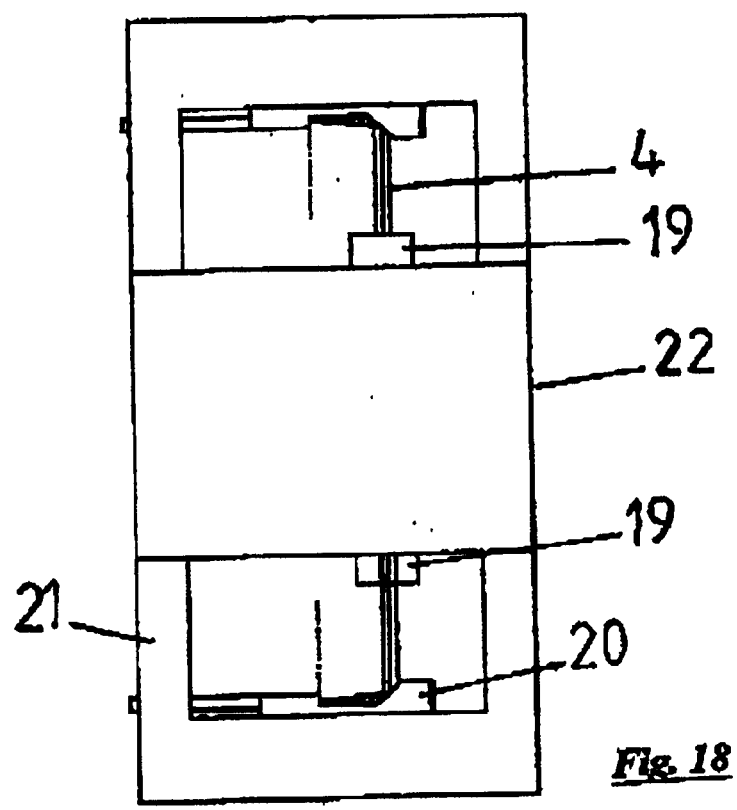
Figure 20:
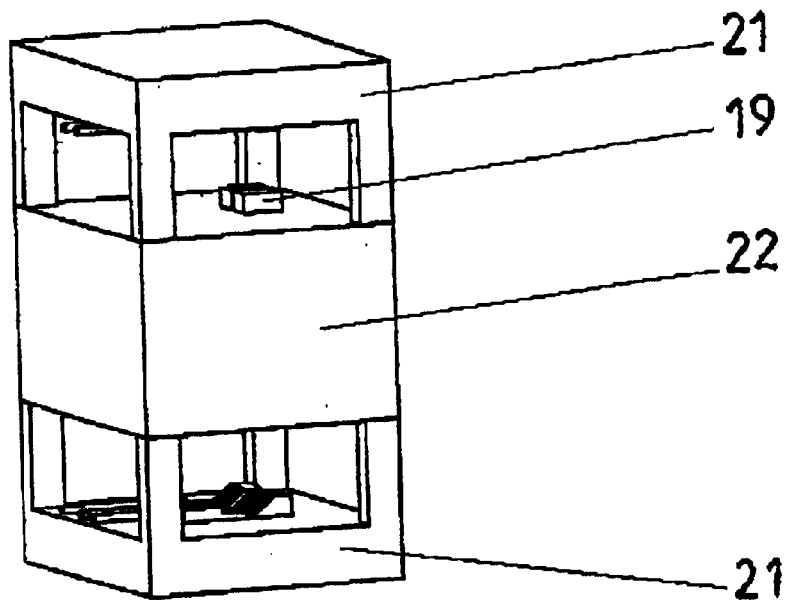

FIGS. 18 and 20 show the assembled multiplexer/de-multiplexer in a side view and a perspective view. In the embodiment shown, the glass plate has a thickness of approximately 5 mm, and the carriers 21 are approximately 2 mm high, so a total height or respectively total width of the multiplexer/de-multiplexer of approximately 9 to 10 mm is produced.

Figure 19:
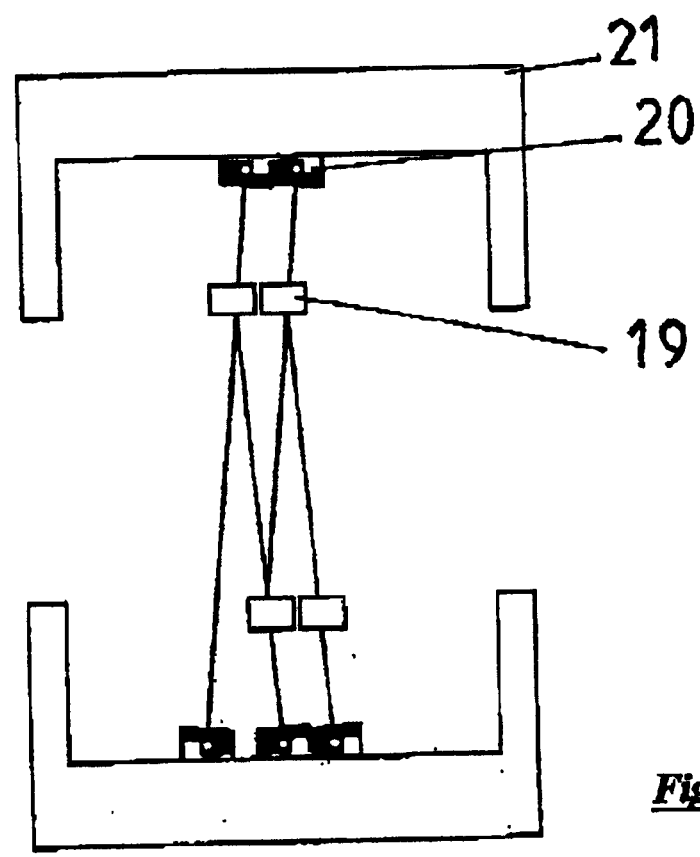
Figure 21:
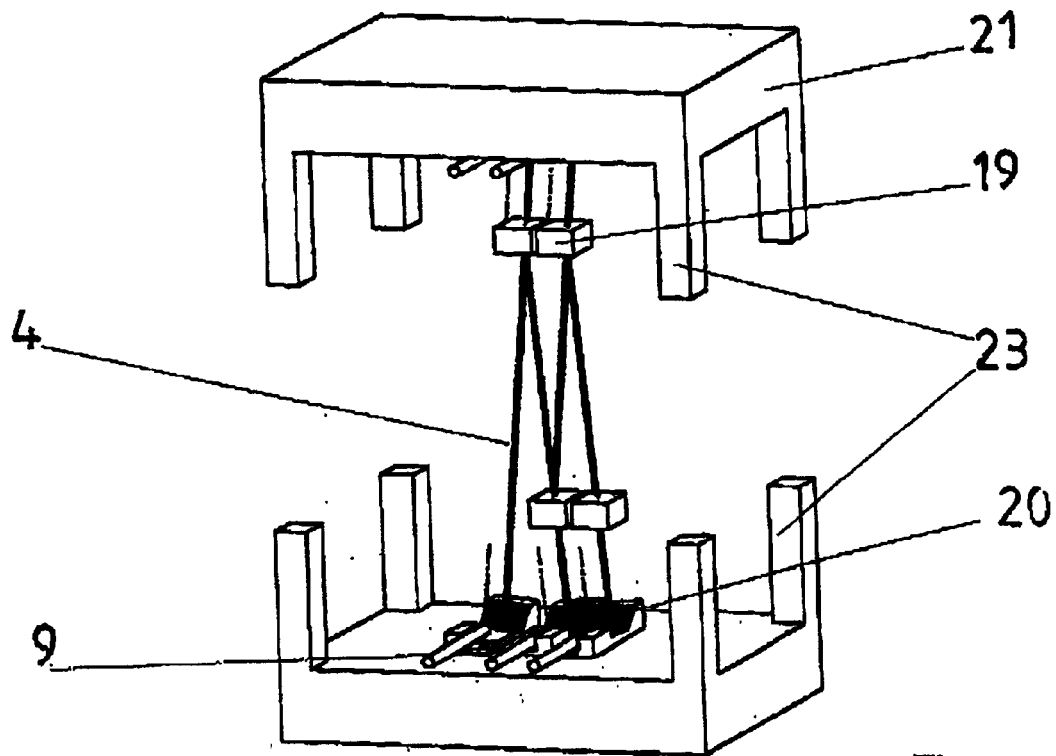

In FIGS. 19 and 21, for reasons of clarity, the glass plate 22 has not been shown. For clarification purposes, the beam path 4 is indicated. The two carriers 21 each have four spacers 23 that extend away from the carriers in the form of feet. By means of the length of the spacers 23, which in the embodiment shown are configured integrally with the carriers 21, the distance between the coupling device and glass plate is determined. If the embodiment shown is sufficiently precisely fabricated, which can be achieved, for example, in the embodiment as a mould part the multiplexer/de-multiplexer can be assembled very easily and "passively" calibrated. After manufacture of the two carriers 21 with the coupling devices 20, they are placed from two opposite directions onto a sheet of glass 22. The wave-modifying elements 19 are simply laid on the glass plate and optionally fixed, for example, with the aid of an adhesive medium The spacers 23 of the carrier 21 establish the correct distance apart of the coupling devices and with respect to the wave-modifying elements. The coupling devices 20 on the carriers 21 are already configured at a right-angle. After calibration of the transmission and receiving elements, for example, of the glass fibres 9, with the aid of limit stops, the multiplexer/de-multiplexer is already calibrated. Complex "active" calibration in which the position of the wave-modifying elements with respect to the coupling devices, or the position of the coupling devices with respect to one another has to be adjusted, is unnecessary but can, however, be done if required.

In contrast to lens systems, the coupling device according to the invention demonstrates no focussing errors. Moreover, only one optical surface is required, so the manufacturing is cheaper and at the same time the otherwise associated tolerance addition is prevented.

Because in contrast to the usual deflecting processes with GRIN lenses, no material is necessary in the beam path of the coupling device, loss through absorption is significantly less.

The coupling devices can be made such that they are not greater than mm or less. Thus, for example, a complex arrangement as shown in FIG. 14 can easily be realised on a surface of 2×2 cm.

| List of designations | |
|---|---|
| (1) | basic body |
| (2) | reflecting surface |
| (3) | incident optical beam |
| (4) | reflected beam |
| (5) | parabola |
| (6) | axis of rotation |
| (7) | limit stop surface |
| (8) | reflecting surface |
| (9) | glass fibre, transmitting or receiving element |
| (10) | ellipse |
| (11) | transmitting or receiving element |
| (12) | limit stop surface |
| (13) | limit stop |
| (19) | wave-modifying element |

-continued

List of designations

| (20) | coupling device |
|---|---|
| (21) | carrier |
| (22) | glass plate |
| (23) | spacer |
| (B) | focal point |

What is claimed is:

1. Optical modifier with at least one input and one output in which signals of one or more electromagnetic wavelength channels are fed into receiving elements and fed out of transmitting elements, said optical modifier comprising:
   a wave modifying element; and
   at least two coupling devices each with a curved reflecting surface, said coupling devices being arranged such that electromagnetic waves that enter at the input of the optical modifier are firstly reflected at the first coupling device, then impinge upon the wave-modifying element and lastly are reflected at the second coupling device towards an output, wherein at least one of the coupling devices includes a limit stop for aligning a respective transmitting and receiving element, said limit stop being integrally formed with the reflecting surface of that coupling device;
   wherein said limit stop and said reflecting surface are arranged on the same side of said coupling device.

2. Optical modifier according to claim 1, wherein each coupling device is configured such that a section through the curved surface approximately corresponds to a portion of a parabola, a hyperbola, or an ellipse.

3. Optical modifier according to claim 1 or 2, wherein each coupling device is configured such that the respective curved reflecting surface has approximately the shape selected of a portion of one of a paraboloid of revolution, ellipsoid of revolution, and a hyperboloid of revolution.

4. Optical modifier according to claim 1 or 2, wherein at least one transmitting element is provided that transmits said electromagnetic waves to a curved reflecting surface of a coupling device and one receiving element is provided that receives electromagnetic waves from the curved reflecting surface of a coupling device.

5. Optical modifier according to claim 4, wherein at least one of said transmitting and receiving elements is arranged in the proximity of a focal point (B) of the curved reflecting surface of the respective coupling device.

6. Optical modifier according to claim 4, wherein at least one of said transmitting and receiving elements is a wave guide of glass fibre.

7. Optical modifier according to claim 1, wherein said limit stop further allows calibration of the respective transmitting and receiving element in two directions being substantially perpendicular to one another.

8. Optical modifier according to claim 7, wherein said limit stop allows calibration of the respective transmitting and receiving element in three directions each being substantially perpendicular to one another.

9. Optical modifier according to claim 1 or 2, wherein said wave-modifying element is a filter.

10. Optical modifier according to claim 9, wherein said filter is a frequency band filter that reflects the electromagnetic waves in at least one certain frequency interval.

11. Optical modifier according to claim 10, wherein said frequency band filter also transmits electromagnetic waves within at least one frequency interval outside of said certain reflective frequency intervals.

12. Optical modifier according to claim 10, also including a third coupling device arranged such that electromagnetic waves reflected from the frequency band filter impinge upon said third coupling device.

13. Optical modifier according to claim 12, wherein said filter is selected from the group of a neutral density filter, a colour filter, a polarising filter, an optical diode, and an optical isolator.

14. Optical modifier with at least one input and one output in which signals of one or more electromagnetic wavelength channels are fed into receiving elements and fed out of transmitting elements, said optical modifier comprising:
   a wave modifying element; and
   at least two coupling devices each with a curved reflecting surface, said coupling devices being arranged such that electromagnetic waves that enter at the input of the optical modifier are firstly reflected at the first coupling device, then impinge uoon the wave-modifying element and lastly are reflected at the second coupling device towards an output, wherein at least one of the coupling devices includes a limit stop for aligning a respective transmitting and receiving element, said limit stop being integrally formed with the reflecting surface of that coupling device;
   wherein said wave-modifying element is selected from the group of an on/off switch, a reflection/transmission switch, and a selection switch.

15. Optical modifier with at least one input and one output in which signals of one or more electromagnetic wavelength channels are fed into receiving elements and fed out of transmitting elements, said optical modifier comprising:
   a wave modifying element; and
   at least two coupling devices each with a curved reflecting surface, said coupling devices being arranged such that electromagnetic waves that enter at the input of the optical modifier are firstly reflected at the first coupling device, then impinge upon the wave-modifying element and lastly are reflected at the second coupling device towards an output, wherein at least one of the coupling devices includes a limit stop for aligning a respective transmitting and receiving element, said limit stop being integrally formed with the reflecting surface of that coupling device;
   wherein each coupling device is configured such that a section through the curved surface approximately corresponds to a portion of a parabola, a hyperbola, or an ellipse;
   wherein said wave-modifying element is selected from the group of an on/off switch, are reflection/transmission switch, and a selection switch.

16. A optical modifier with at least one input for receiving electromagnetic waves and one output for transmitting on electromagnetic wave received, said optical modifier coupling at least two fibre glass electromagnetic waveguides, comprising:
   at least one first receiving waveguide connected to said input;
   a least one second transmitting waveguide connected to said output; and
   a first reflecting surface aligned for receiving electromagnetic waves from said receiving waveguide and reflecting said electromagnetic waves to said transmitting waveguide, reflecting surface being defined as a part of a surface of revolution with a cone section as the generating curve of the envelope, said reflecting surface being machined and polished in an electromagnetic wave transparent material;
   wherein said optical modifier is a first optical modifier and also including a first carrier upon which said first optical modifier is mounted;

wherein said first carrier with said first optical modifier mounted thereon is arranged on one side of said plate; and also including a second carrier with a second said optical modifier mounted thereon, said second carrier being arranged on the opposite side of said plate from said first carrier.

17. The optical modifier of claim 16, also including a limit stop surface perpendicular to the axis of rotation of the reflecting surface and formed into said transparent material and wherein said machined surface is selected of one of being turned and of being milled.

18. The optical modifier of claim 17, wherein said transparent material is molded prior to milling and polishing.

19. A optical modifier with at least one input for receiving electromagnetic waves and one output for transmitting on electromagnetic wave received, said optical modifier coupling at least two fibre glass electromagnetic waveguides, comprising:

at least one first receiving waveguide connected to said input;

a least one second transmitting waveguide connected to said output;

a first reflecting surface aligned for receiving electromagnetic waves from said receiving waveguide and reflecting said electromagnetic waves to said transmitting waveguide, reflecting surface being defined as a part of a surface of revolution with a cone section as the generating curve of the envelope, said reflecting surface being machined and polished in an electromagnetic wave transparent material; and a limit stop surface perpendicular to the axis of rotation of the reflecting surface and formed into said transparent material and wherein said machined surface is selected of one of being turned and of being milled;

wherein said transparent material is molded prior to milling and polishing;

wherein said optical modifier is a first optical modifier and also including a first carrier upon which said first optical modifier is mounted; and also including a plate, wherein said first carrier with said first optical modifier mounted thereon is arranged on one side of said plate, and also including a second carrier with a second said optical modifier mounted thereon, said second carrier being arranged on the opposite side of said plate from said first carrier.

20. The optical modifier of claim 19, also including at least one electromagnetic wave modifying element arranged on said plate.

21. The optical modifier of claim 20, wherein said first and second carriers are arranged such that electromagnetic waves from said first optical modifier are focused on said second optical modifier, and wherein said electromagnetic wave modifying element is arranged in the path of said electromagnetic waves from said first optical modifier to said second optical modifier.

* * * * *

UNITED STATES PATENT AND TRADEMARK OFFICE
CERTIFICATE OF CORRECTION

PATENT NO. : 6,832,031 B2
DATED : December 14, 2004
INVENTOR(S) : Ingo Smaglinski It is certified that error appears in the above-identified patent and that said Letters Patent is hereby corrected as shown below:

Column 9,
Line 20, change "fire" to -- fibre --;
Line 44, delete one "that", should read -- such that light --;

Column 10,
Line 13, insert -- be -- after "have to", should read -- have to be arranged --;

Column 14,
Line 48, delete "A" before "optical", should read -- Optical modifier --;
Line 55, change "a" to -- at --, should read -- at least --;

Column 15,
Line 15, delete "A" before "optical", should read -- Optical modifier --;
Line 22, change "a" to -- at --, should read -- at least --.

Signed and Sealed this

Twelfth Day of April, 2005

JON W. DUDAS
*Director of the United States Patent and Trademark Office*